United States Patent
Dabon et al.

(10) Patent No.: US 11,200,471 B2
(45) Date of Patent: Dec. 14, 2021

(54) CUT-OUT SCANNING SYSTEM

(71) Applicant: KYOCERA Document Solutions Inc., Osaka (JP)

(72) Inventors: Philip Ver Paloma Dabon, Torrance, CA (US); Neil-Paul Payoyo Bermundo, Glendora, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 25 days.

(21) Appl. No.: 16/789,066

(22) Filed: Feb. 12, 2020

(65) Prior Publication Data

US 2021/0248433 A1    Aug. 12, 2021

(51) Int. Cl.
  *G06F 3/12*    (2006.01)
  *G06K 15/02*   (2006.01)

(52) U.S. Cl.
  CPC .............................. *G06K 15/1868* (2013.01)

(58) Field of Classification Search
  CPC .................................................. G06K 15/1868
  USPC ...... 358/1.1–3.29, 1.11–1.18, 505, 537–540, 358/304–305
  See application file for complete search history.

(56) References Cited

U.S. PATENT DOCUMENTS

| | | | |
|---|---|---|---|
| 5,748,762 A * | 5/1998 | Guez | G06Q 10/043 382/111 |
| 6,732,152 B2 | 5/2004 | Lockhart | |
| 8,804,139 B1 | 8/2014 | Arora | |
| 9,652,185 B2 | 5/2017 | Ono | |
| 10,324,673 B1 | 6/2019 | Dabon | |
| 10,860,268 B2 | 12/2020 | Dabon | |
| 2010/0315659 A1 | 12/2010 | Tatsuno | |
| 2019/0212959 A1 | 7/2019 | Dabon | |
| 2019/0265926 A1 * | 8/2019 | Dabon | B26D 5/005 |

FOREIGN PATENT DOCUMENTS

DE    10144703    3/2002

OTHER PUBLICATIONS

Brother International Corporation; "ScanNCut Fabric Cutter with Built in Scanner CM100DM"; http://www.brother-usa.com/scanncut/cm100dm.aspx; Oct. 12, 2017; downloaded Jan. 9, 2018; 2 pages.
Dabon; U.S. Appl. No. 15/863,694, filed Jan. 5, 2018.
Dabon; U.S. Appl. No. 16/409,768, filed May 10, 2019.

(Continued)

*Primary Examiner* — Marcellus J Augustin
(74) *Attorney, Agent, or Firm* — Fitch, Even, Tabin & Flannery LLP

(57) ABSTRACT

Methods and systems for identifying cut-out patterns from a scanned raw image file and arranging shapes within a document prior to printing cut-out patterns are described. A printing device may identify and group contents in a page of a print job as shapes to be cut out from the paper after they are printed. The printing device may then detect the grouped page contents as cut-out patterns. For each cut-out pattern, the printing device may detect the white spaces of content of the cut-out pattern and mark them as available for printing other cut-out patterns. Thus, the printing device may print multiple cut-out patterns on a same page based on using the white space within larger cut-out patterns.

20 Claims, 13 Drawing Sheets

(56) References Cited

OTHER PUBLICATIONS

USPTO; Notice of Allowance issued in U.S. Appl. No. 15/863,694 dated Feb. 5, 2019.
USPTO; Restiction Requirement issued in U.S. Appl. No. 15/863,694 dated Jul. 11, 2018.
USPTO; Non-Final Office Action issued in U.S. Appl. No. 16/409,768 dated May 13, 2020.
USPTO; Examiner Interview Summary issued in U.S. Appl. No. 16/409,768 dated Aug. 13, 2020.
USPTO; Notice of Allowance issued in U.S. Appl. No. 16/409,768 dated Aug. 27, 2020.

* cited by examiner

CUT-OUT SCANNING SYSTEM

This application relates to CUT-OUT PRINTING SYSTEM described in the following application, which is incorporated herein by reference:

U.S. patent application Ser. No. 15/863,694, of Dabon et al.; entitled CUT-OUT PRINTING SYSTEM; now U.S. Pat. No. 10,324,673.

BACKGROUND OF THE INVENTION

1. Field of the Invention

The present invention relates generally to printing and cutting, and more specifically to arranging shapes (also referred to as cut-out patterns) within a document prior to printing cut-out images.

2. Discussion of the Related Art

Various systems and processes are known in the art for arranging shapes (cut-out patterns) within a document prior to printing cut-out images. Existing cut-out devices lay out shapes next to each other on a page and then cut out the shapes. Empty space that exists within a shape (for example, the center of a donut shape) is left blank. When the shapes are cut out from paper, the portions of the page comprising the empty space within shapes are wasted. The waste of paper in current cut-out devices disagrees with worldwide efforts to conserve trees, which are the source of paper.

When making cut-out patterns using the systems and methods currently known in the art, there may typically be sheets and sheets (or several copies) of a set of patterns that would be scanned for cutting to a cutter, finisher, or cutting machine. When each sheet contains a single patterns and there are a lot of unused spaces in the paper not used for patterns, there will be a lot of wasted paper. It would be desirable to use those white spaces for other cut-out patterns so that the paper will be used optimally.

Ideally, the original sheet of paper to be scanned would contain cut-out patterns that are well laid-out, in the first place. But in real life, this is usually not the case. In most cases, there will be an original document containing shapes that are aligned in one orientation for easier reading and viewing using desktop applications, web browser or viewers. It will not be user- and reader-friendly to have a page with shapes that are all over the place. Further, different writers, artists or designers may have created and provided different sheets of cut-out patterns. Thus, in most cases, there can be an original set of document or sheets of paper with patterns that are meant to be made into cut-out patterns.

In such a case, it would be desirable to keep an original hard-copy set of pages with patterns, in a user- and reader-friendly layout, and then, create a new layout with the cut-out patterns optimized for cutters or finishing units. Then, multiple copies of the new set can be made so that the cutters or finishing units will process and perform the cutting on optimized sheets of paper.

Therefore, there exists a need in the art for systems, methods and devices that scan hard-copy pages of patterns and be able to identify the cut-out shapes and arrange them optimally on new pages that are submitted to cutters or fed to finishing devices.

SUMMARY

A printing device may identify and group contents in a page of a print job as shapes (cut-out patterns) to be cut out from the paper after they are printed. The printing device may then detect the grouped page contents as cut-out patterns. For each cut-out pattern, the printing device may detect the white space (portions of pages or images that are left unmarked, also referred to as negative space) of content of the cut-out pattern and mark it as available for printing other cut-out patterns. Thus, the printing device may print multiple cut-out patterns on a single page based on using the white space within larger cut-out patterns.

In one embodiment, a printing system is described. The printing system may include a printing device and a scanning service in communication with the printing device and adapted to: receive a plurality of page description language (PDL)-formatted cut-out patterns; receive a reference to a logical page; detect white space in the plurality of PDL-formatted cut-out patterns by detecting areas with no color; optimally position the PDL-formatted cut-out patterns on the logical page, wherein the optimal positioning includes locating a PDL-formatted cut-out pattern, that fits within interior white space of another a PDL-formatted cut-out pattern, within the interior white space of the other a PDL-formatted cut-out pattern; and generate a PDL drawing command for each PDL-formatted cut-out pattern identifying an outline of the PDL-formatted cut-out pattern identifying where at least one of cutting and perforation will occur on the logical page.

A method of printing and cutting is described. The method may include the steps of receiving a plurality of page description language (PDL)-formatted cut-out patterns; generating a page description language (PDL)-formatted cut-out pattern for each identified cut-out pattern; detecting white space in the plurality of PDL-formatted cut-out patterns by detecting areas with no color; optimally positioning the plurality of PDL-formatted cut-out patterns on a logical page, wherein the optimal positioning includes locating a PDL-formatted cut-out pattern, that fits within interior white space of another PDL-formatted cut-out pattern, within the white space of that PDL-formatted cut-out pattern; and generating a PDL drawing command for each PDL-formatted cut-out pattern identifying an outline of the PDL-formatted cut-out pattern identifying where at least one of cutting and perforation will occur on the logical page.

In another embodiment, a printing system is described. The printing system may include a printing system comprising: a printing device; a cut-out scanning service comprising: an image processor configured to receive raw image data, identify cut-out patterns in the raw image data, and create image-formatted cut-out pattern data from the raw image data; and a page description language (PDL) generator configured to receive the image-formatted cut-out pattern data and convert the image-formatted cut-out pattern data to a plurality of PDL-formatted cut-out patterns; and a cut-out printing service configured to: receive the plurality of PDL-formatted cut-out patterns; receive a reference to a logical page; detect white space in the plurality of PDL-formatted cut-out patterns by detecting areas with no color; optimally position the PDL-formatted cut-out patterns on the logical page, wherein the optimal positioning includes locating a PDL-formatted cut-out pattern, that fits within interior white space of another a PDL-formatted cut-out pattern, within the interior white space of the other a PDL-formatted cut-out pattern; and generate a PDL drawing command for each PDL-formatted cut-out pattern identifying an outline of the PDL-formatted cut-out pattern, including identifying where at least one of cutting and perforation will occur on the logical page.

A method of printing and cutting by a printing system is described. The method may include the steps of: receiving of raw image data; identifying cut-out patterns in the raw image data; creating image-formatted cut-out pattern data from the raw image data; converting the image-formatted cut-out pattern data to a plurality of PDL-formatted cut-out patterns; receiving a reference to a logical page; detecting white space in the plurality of PDL-formatted cut-out patterns by detecting areas with no color; optimally positioning the PDL-formatted cut-out patterns on the logical page, wherein the optimal positioning includes locating a PDL-formatted cut-out pattern, that fits within interior white space of another a PDL-formatted cut-out pattern, within the interior white space of the other a PDL-formatted cut-out pattern; and generating a PDL drawing command for each PDL-formatted cut-out pattern identifying an outline of the PDL-formatted cut-out pattern identifying where at least one of cutting and perforation will occur on the logical page.

Figure 1:
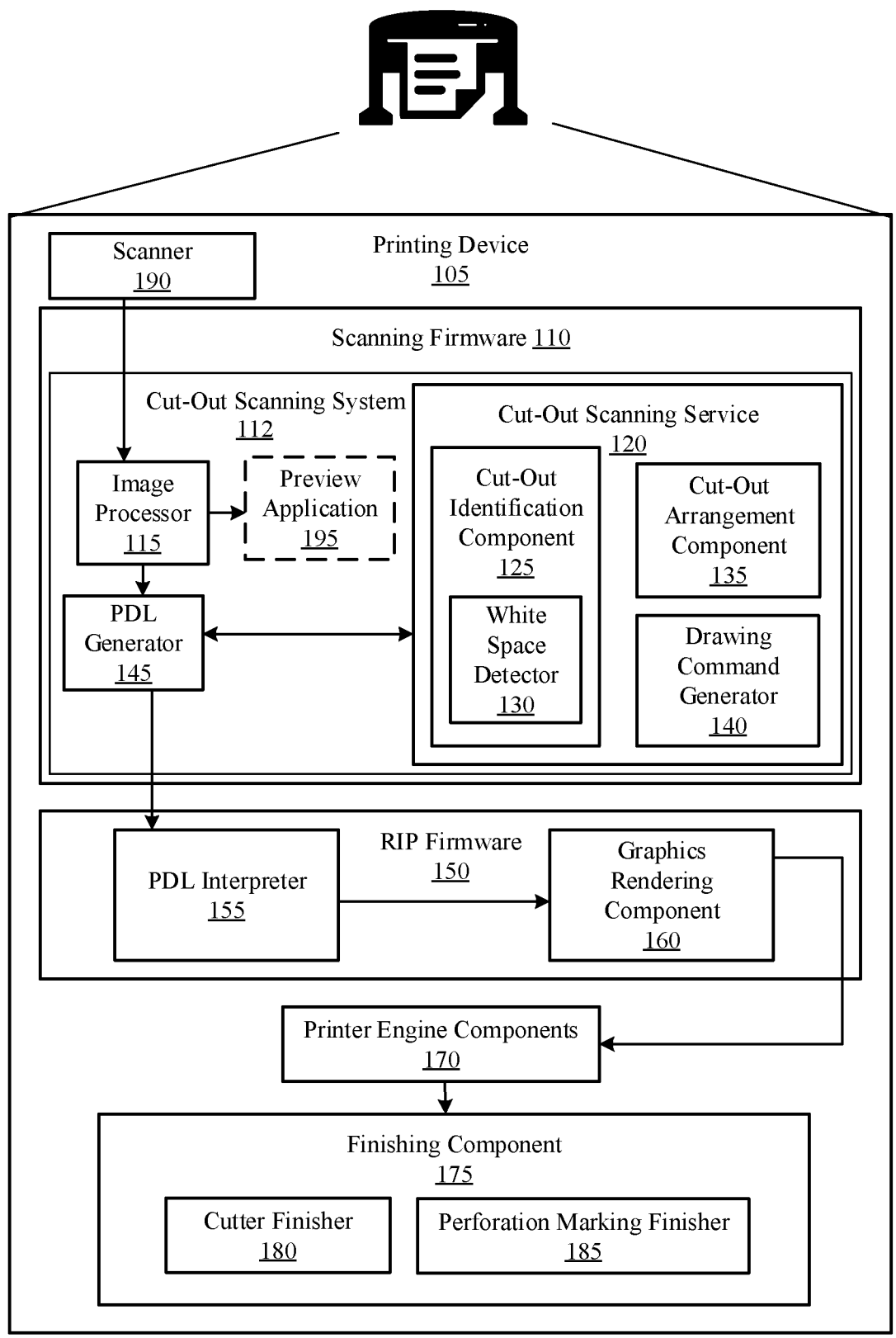
FIG. 1 shows a diagram of a Scanning/Printing System that supports receiving image files and arranging shapes within a document prior to printing cut-out images in accordance with aspects of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

According to the present disclosure, a print job may include shapes, cut-out patterns or other markings on the page that are intended to be cut-out patterns. The printing device may identify and/or group contents in a page as shapes to be cut out from the printing medium after they are printed. In some cases, a printing device may include raster image processor (RIP) firmware. The RIP firmware itself may enable the drawing of labels, images, cut-out patterns and shapes as defined in documents or page description language (PDL) print jobs.

The printing device may detect the grouped page contents as candidates for cutting out of the paper (e.g., using a PDL Interpreter). Such groups of shapes or cut-out patterns can be called cut-out patterns. For each cut-out pattern, the printing device may detect the white space of content of the cut-out pattern, and mark it as available for use for other cut-out patterns. In effect, there may eventually be nested cut-out patterns on the printed paper.

In some embodiments, "white area" and "white space" refer to an area in the printed paper without rendered shape or page object. White area/space may correspond to the parts of a cut-out pattern that has no color nor drawing. For example, in a donut raster image, the hole in the middle of the donut may be considered a white area, because the area will be unused and unprinted on in the actual printed paper.

In some embodiments, "cut-out path" and "clipping path" refer to a shape path to be used by the cutting finisher or perforation marking tool to cut out the cut-out pattern from the paper. A shape path may be a regular shape (e.g. circle, square, and rectangle) or an irregular shape comprising a series of coordinate points. In some embodiments, a cut-out path may comprise a mathematical formula that draws a shape with coordinates and/or locations on paper.

The systems and methods disclosed herein are provided to minimize waste of paper material by receiving scanned image files and sorting and arranging shapes in the pages of a document so that there is minimal, and in some cases zero, waste.

White areas or white spaces are those unprinted or un-used areas on the paper media. Those are areas where there is no shape drawn nor ink applied on the paper. Because this is for cut-out patterns, those un-used areas will just be thrown away as wasted paper material. If only one cut-out pattern is assigned to each page, there could be a lot of wasted paper material. If the white areas could be used for the smaller shapes, less paper would be wasted.

The systems disclosed herein provide solutions in system, method and device forms that address the above concern. The systems will focus on scanned pages and be able to create cut-out patterns optimally in new paper. In this system, an original printout (illustration page, template, cut-out patterns in separate sheets) would be processed, and the various patterns will be consolidated in a new document file or sheets of paper where the patterns are optimally laid out to maximize use of the paper material. The said new document file or sheets of paper with optimal layout of the cut-out-patterns will be the one to be submitted to cutters or fed to finishing devices.

The methods and systems disclosed herein work in conjunction with related U.S. patent application Ser. No. 15/863,694 by the same inventors, now U.S. Pat. No. 10,324,673 which is incorporated in its entirety herein by reference.

FIG. 1 shows a diagram of a Scanning/Printing System 100 that supports receiving image files and arranging shapes within a document prior to printing cut-out images in accordance with aspects of a first embodiment of the present disclosure. Scanning/Printing System 100 may include Printing Device 105.

Printing Device 105 may include Scanner 105, Scanning Firmware 110, Raster Image Processor (RIP) Firmware 150, Printer Engine Components 170, and Finishing Component 175.

The scanner 190 is configured to scan a hardcopy page and acquire a full-size rasterized image file or a pixelmap image file of the page being scanned. The file obtained by the scanner is a full image or full raster file, and is unlike a page description language (PDL) print job, which consists of various page objects, such as text, shapes or images that are all described in certain specific PDL commands.

Scanning Firmware 110 may include a Cut-Out Scanning System 112. The Cut-Out Scanning System 122 may include an Image Processor 115, a Page Description Language (PDL) generator 145, and a Cut-Out Scanning Service 120. The scanner 190 is in communication with the image processor 115.

The Image Processor 115 is configured to perform image recognition to distinguish shapes in each scanned image file received from the scanner 190, determine whether two or more shapes should be grouped together into a larger single cut-out pattern, and for each group of shapes determined to be grouped together into a single cut-out-pattern, create cut-out outline data for the grouped shape.

In some embodiments, determining whether shapes should be grouped together includes grouping shapes that interconnect into a single cut-out pattern. In some embodiments, determining whether shapes should be grouped together includes not grouping together shapes that have gaps or are not connected, or are separated by white areas. In some embodiments, shapes that belong inside another shape, or are surrounded by another shape, may be considered grouped into a single cut-out pattern. In some embodiments an optional preview and marking application 195 coupled to a display of the printer 105 or to a display of a computer is provided to display the groupings determined by the image processor 115 and allow the user to edit the groupings determined by the image processor 115. For example, the user may group together previously ungrouped shapes to form more complex shapes.

Once each shape has been identified and all groups have been determined, the cut-out patterns data (which includes the image data, shape data, and the grouping data), is sent to the PDL Generator.

The process for the operation of the image processor 115 is described further below in FIG. 13.

The PDL generator 145 is a sub-component of the Cut-Out Scanning System 112. The PDL generator 145 receives the cut-out patterns data that the Image Processor 115 gathered and generated from the scanned full-page raster. The PDL Generator 145 is configured to perform the following steps: First, create a logical page, if not yet created. Second, convert the cut-out pattern data from the image processor 115 into PDL data (also referred to as print job data). Third, relay reference to the logical page and to the cut-out pattern data to the Cut-Out Scanning Service 120 for layout out of the cut-out pattern data on to the logical page. These steps are described further below with respect to FIG. 5.

The Cut-Out Scanning Service 120 is an important new module in the Cut-Out Scanning System 112. The Cut-Out Scanning Service 120 is configured to perform the major features and services to accomplish the goals of this invention, which is to optimally lay out the cut-out patterns on the page to save on paper material when producing the cut-out patterns on actual paper. The Cut-Out Scanning Service 120 and the PDL generator 145 work together to accumulate the cut-out patterns into logical pages to form a PDL print job.

The Cut-Out Scanning Service 120 comprises a cut-out identification component 125 (which includes a white space detector 130), a cut-out arrangement component 135, and a drawing command generator 140.

In general, the Cut-Out Scanning Service 120 is configured to perform the following steps: First, the Cut-Out Scanning Service 120 receives the PDL cut-out pattern data from the PDL Generator 145 representing a cut-out pattern. Second, the Cut-Out Scanning Service 120 identifies any white areas in the pattern. Third, the Cut-Out Scanning Service 120 performs different methods to position the cut-out pattern optimally on the logical page. Fourth, the Cut-Out Scanning Service 120 marks a cut-out path for the pattern on the page. These steps are performed until the logical page is full or there are no more cut-out patterns to process. Last, the completed page is sent to the RIP Firmware 150 for processing and rendering onto paper. This method is further described below with respect to FIG. 5.

The Cut-Out Scanning Service 120 may be an example of a scanning service comprising a White Space Detector 130 adapted to detect white space in an image by detecting areas with no color, and an image combiner for combining a plurality of images at least one of which has been processed by the White Space Detector 130, by locating at least another of the plurality of images in the white space of the at least one of the plurality of images. In some examples, Cut-Out Scanning Service 120 may include Cut-Out Identification Component 125, Cut-Out Arrangement Component 135, and Drawing Command Generator 140.

The Cut-Out Scanning Service 120 receives the parsed PDL data, such as PDL commands, page content data (text (which is a special type of image), images, shapes, cut-out patterns and so on) and other features from the PDL Generator 145. The parsed data may come in the form of shapes or page objects like text, rasters/images, etc. The Cut-Out Scanning Service 120 may then relocate cut-out patterns to white areas, and mark cut-out patterns for the finishers.

The Cut-Out Scanning Service 120 may identify shapes, determine the page locations of each shape, and determine the white areas within each shape. Areas may be determined to be white areas if there is no color (toner, ink) or if transparency inside the shape meets a threshold level (e.g., 100% transparency). In some cases, an incoming pattern has 100% transparency, but it overlaps a previously positioned cut-out pattern. If the overlapping areas are not empty or transparent, then they may not be counted as white areas. These areas may be re-marked as a non-white area or occupied.

The Cut-Out Scanning Service 120 may then sort the cut-out patterns based on the total area and the size of the white area. The Cut-Out Scanning Service 120 may then re-process and sort the cut-out patterns to make use of the white areas. Smaller cut-out patterns that fit into the white areas may be repositioned for rendering into the white areas. This may effectively compress the page contents into less space on the page. In some cases, it may be possible to group all shapes from multiple pages into one page, thereby maximizing use of the printing medium.

The Cut-Out Scanning Service 120 may then tag values to be assigned to each cut-out path (or clipping path) for use in the finishers. (A cut-out path or clipping path is a closed vector path, or shape, used to cut out a 2D image. Any portion of the shape inside the path will be included after the cut-out path, (or clipping path) is applied, and anything outside the path will be omitted.) In some cases, drawing commands may be added to describe the cut-out path or outline. This would be additional drawing data for processing in Graphics Rendering Component 160. This may result in the rendering of dashed lines, the markings for perforation marks around the cut-out patterns and in the interior white areas, and the markings for cutting around the cut-out patterns and interior white areas.

Cut-Out Identification Component 125 may order multiple patterns (e.g., the aforementioned first cut pattern, second cut pattern, and third cut pattern) from largest to smallest; identify white space in the first cut pattern, the second cut pattern and the third cut pattern; locate the largest of the first cut pattern, the second cut pattern, and the third cut pattern on a page; identify white space in one of the plurality of input images; determine the largest one of remaining ones of the plurality of input images that will fit the white space having been identified; and locate the largest one of the remaining ones of the plurality of input images having been determined in the white space. In some examples, Cut-Out Identification Component 125 may include White Space Detector 130.

In some cases, the identifying of the white space in the one of the plurality of input images comprises excluding a margin from the white space, and where the identifying of the remaining white space in the one of the plurality of input images comprises excluding another margin from the remaining white space. In some cases, the identifying of the white space in the one of the plurality of input images comprises excluding a margin from the white space.

Cut-Out Arrangement Component 135 may determine whether a second largest of the first cut pattern, the second cut pattern, and the third cut pattern will fit within white space in the largest of the first cut pattern, the second cut pattern, and the third cut pattern; and locate when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern; locate when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern.

Cut-Out Arrangement Component 135 may also generate the output image comprising one of the plurality of input images and the largest one of the remaining ones of the plurality of input images having been positioned in the white space; identify, after the locating of the largest one of the remaining ones of the plurality of input images, remaining white space in the one of the plurality of input images; determine, after the identifying of the remaining white space, a next largest one of the remaining ones of the plurality of input images that will fit in the remaining white space; and position the next largest one of the remaining ones of the plurality of input images having been determined in the remaining white space.

Drawing Command Generator 140 may identify cut-out patterns and add additional drawing and cutting commands. For example, Drawing Command Generator 140 may identify a cut line, where the cut line is a prescribed distance from an edge of the one of the plurality of input images; identify another cut line, where the other cut line is another prescribed distance from an edge of the largest one of the remaining ones of the plurality of input images having been determined; identify a cut line, where the cut line is a prescribed distance from an edge of the one of the plurality of input images, printing the output image, and printing a marking indicator along the cut line having been identified; identify another cut line, where the other cut line is another prescribed distance from an edge of the largest one of the remaining ones of the plurality of input images having been determined, and printing another marking indicator along the other cut line; identify another cut line, where the other cut line is another prescribed distance from an edge of the largest one of the remaining ones of the plurality of input images having been determined, and perforating the paper along the other cut line; identify a cut line, where the cut line is a prescribed distance from an edge of the one of the plurality of input images, printing the output image onto paper, and perforating the paper along the cut line having been identified; identify a cut line, where the cut line is a prescribed distance from an edge of the one of the plurality of input images, printing the output image onto paper, and cutting the paper along the cut line having been identified; and identify another cut line, where the other cut line is another prescribed distance from an edge of the largest one of the remaining ones of the plurality of input images having been determined, and cutting the paper along the other cut line.

The RIP Firmware 150 includes a PDL Interpreter 155 and a Graphics Rendering Component 160. The PDL Interpreter 155 of the embodiment shown in FIG. 1 is substantially the same as current PDL interpreters in MFP, printers, or imaging devices. The PDL Interpreter 155 is configured to interpret the PDL data (print job data) received from the PDL Generator 145 and translate the data into configuration or drawing commands.

The PDL Interpreter 155 may parse PDL data from an incoming print job until it consumes all of the data, and translate the data into a format readable by the Graphics Rendering Component 145. The PDL Interpreter 155 may include one or more PDL interpreters for different computing languages. Such languages may include printer command language (PCL) 5, PCL 6 (XL), XPS, PDF, PostScript, and so on. The PDL Interpreter 155 may parse and translate the commands, data, and features of the corresponding PDL.

In the embodiment shown the PDL Interpreter 155 is also configured to understand, process, and translate the PDL data for instructions for making cut-outs. In particular, the PDL Interpreter 155 understands, processes, and translates the PDL data into instructions for an element of a Finishing Component 175 of the printing device 105, a Cutter Finisher 180 and/or a Perforation Marking Finisher 185. These instructions will not cause any markings or drawings to be done on the paper, unless the instructions are for perforation marks. The instructions are rather data that will, if issued as instruction to the Cutter Finisher 180, cause the cutter finisher to perform cutting maneuvers or actions on the paper. If the instructions are issued for the Perforation Marking Finisher 185, the perforation marking finisher 185 will print dashed lines that serve as perforation marks around the actual cut-out patterns.

The PDL Interpreter 155 sends the printing and finishing instructions to the graphics rendering component 160. The graphics rendering component 160 generates graphics order and/or drawing commands for instruction of printer engine components. The Graphics Rendering Component 160 may receive data from PDL Interpreter 155 and translate the data to a lower-level format for the Printer Engine Components 170. The lower-level format may be known as the orderlist and may include a list of configuration, drawing and marking commands. In some examples, the cut-out patterns described and drawn from the graphics orders would still compose a single page (or other media that can be cut) from the perspective of the graphics rendering component 160. However, the pages processed in The Graphics Rendering Component 160 may not be the same pages generated by the PDL Interpreter 155.

In some embodiments, "orderlist" refers to binary data representation to which PDL commands are translated to by a graphics rendering component. Orderlists may comprise low-level graphics instructions (also known as graphics orders) that a Multi-Function Printer (MFP) hardware understands and processes to translate to actual markings on the page.

As currently known in the art, print job data comprises PDL data to be processed through the PDL Interpreter. The PDL interpreters relay configuration and drawing commands to the graphics rendering component, which then translates the data to graphics orders. The graphics orders are low-level instructions that the printer engine can process efficiently and specifically for the low-level engine components of the engine, such as application-specific integrated circuits (ASIC), graphics execution unit (GEU), Halftone unit, etc. In a traditional embodiment the Graphics rendering component essentially produces the graphics orders for the cut-out patterns that are intended to be cut out of the paper. In effect, the graphics rendering component would generate graphics orders for any and all page contents in the pages from the PDL print job. The print job data processed through the graphics rendering component is normally on a page-by-page basis. The graphics orders belong to and are drawn on one page.

However, in the embodiment shown in FIG. 1, with Cut-Out Scanning Component 112 supported, the Graphics Rendering Component 160 includes updated features to support generation of new graphics orders that are instructions for the cutter-finisher and/or perforation marking tools to draw, mark or cut the cut-out patterns on the printed paper. These specific instructions will not make any markings on the paper, unless they are for perforation marks. These instructions will not be performed at main Printer Engine Components 170, but rather at finishing components, such as the Cutter Finisher 180 or Perforation Marking Finisher 185.

In this embodiment, the PDL print job generated from the Cut-Out Scanning System 112 (or in particular, from the PDL Generator 145 and Cut-Out Scanning Service 120), will include PDL data that are instructions for the Cutter Finisher 180 and/or Perforation Marking Finisher 185. From the original scanned pages, the Cut-Out Scanning System 112 (through the PDL Generator 145 and Cut-Out Scanning Service 120), would have re-ordered the page contents that normally would compose a single page. Because of the operations in the Cut-Out Scanning System 112, the page contents would have been repositioned in the page, and potentially, objects from subsequent page(s) would have been relocated to a single page, due to the objectives of this invention.

The Cut-Out Scanning System 112 may have also added extra drawing commands to describe the cut-out pattern path or outline. These drawing commands could result in the graphics rendering component generating graphics orders for dashed lines and/or perforation marks around the cut-out patterns and in the interior white areas.

Therefore, in the present embodiment the Graphics Rendering Component 160 is configured to produce graphics orders for the cut-out patterns that are intended to be cut out of the paper. The Graphics Rendering Component 160 is configured to support generation of new graphics orders that are instructions for the Cutter Finisher 180 to cut the cut-out patterns on the printed paper and/or instructions for perforation marking tools of the Perforation Marking Finisher 185 to draw perforation marks on the page in and around the cut-out patterns. These specific instructions will not result any markings on the paper, unless the instructions are for perforation marks. These instructions will not be performed at the main Printer Engine Components 170, but rather at the finishing components, such as the Cutter Finisher 180 or Perforation Marking Finisher 185.

Printer Engine Components 170 may process the graphics orderlist from the Graphics Rendering Component 160, and perform actual drawing and application of ink or toner onto physical paper media (or other printable media). This may include rendered dashed-lines and perforations if those features were enabled for the print job. In some cases, the Printer Engine Components 170 may include GEU, Halftone, and Video subcomponents.

In some examples, Finishing Component 175 may include Cutter Finisher 180 and Perforation Marking Finisher 185. Cutter Finisher 180 may be an example of a cutting device configured to cut the one of the plurality of images from the other of the plurality of images by cutting recording media after printing the one of the plurality of images and the other of the plurality of images, where the cutting comprises completely cutting the recording media. Thus, finishing the page may include cutting at a perimeter of the ones of the first cut pattern, the second cut pattern, and the third cut pattern having been located.

The Cutter Finisher 180 performs the actual cutting of the cut-out patterns generated through the Cut-Out Scanning System 112. Each cut-out pattern may enclose smaller cut-out pattern that happened to fit inside its white areas.

In addition or alternatively, the Perforation Marking Finisher 185 cuts, pokes or punches tiny pointed marks or holes that form perforation marks on the page that separate one of the plurality of images and the others of the plurality of images, where the cutting comprises perforating (or partially cutting) the recording media. Thus, finishing the page may include perforating at a perimeter of the ones of the first cut pattern, the second cut pattern and the third cut pattern having been located. Perforation Marking Finisher 185 designs may include rollers with single perforation pins and rollers with multiple rows of perforation pins.

Once paper is printed on, it may be fed onto the Cutter Finisher 180 for cutting or Perforation Marking Finisher 185 for cutting of perforations.

Scanning/Printing System 100 may be an example of a printing system comprising a printing device and a scanning service in communication with the printing device, wherein the scanning service is adapted to receive a plurality of page description language (PDL)-formatted cut-out patterns, receive a reference to a logical page, detect white space in the plurality of PDL-formatted cut-out patterns by detecting areas with no color, optimally position the PDL-formatted cut-out patterns on the logical page, wherein the optimal positioning includes locating a PDL-formatted cut-out pattern, that fits within interior white space of another a PDL-formatted cut-out pattern, within the interior white space of the other a PDL-formatted cut-out pattern; and generate a PDL drawing command for each PDL-formatted cut-out pattern identifying an outline of the PDL-formatted cut-out pattern identifying where at least one of cutting and perforation will occur on the logical page.

In another embodiment Scanning/Printing System 100 may additionally comprise the scanning service further configured to generate a PDL print job including the PDL-formatted cut-out patterns optimally positioned on the logical page, and the PDL drawing commands.

In another embodiment Scanning/Printing System 100 may additionally comprise a raster image processing (RIP) service configured to receive the PDL print job from the scanning service.

In another embodiment Scanning/Printing System 100 may additionally comprise a PDL generator configured to receive image-formatted cut-out pattern data, convert the cut-out pattern data to PDL-formatted cut-out patterns, and send the PDL-formatted cut-out patterns to the scanning service.

In another embodiment Scanning/Printing System 100 may additionally comprise an image processor configured to receive raw image data, identify cut-out patterns in the raw image data, create image-formatted cut-out pattern data from the raw image data, and send the image-formatted cut-out data to the PDL generator.

In another embodiment Scanning/Printing System 100 may additionally comprise a scanner configured to capture raw image data and send the raw image data to the image processor.

Figure 2:
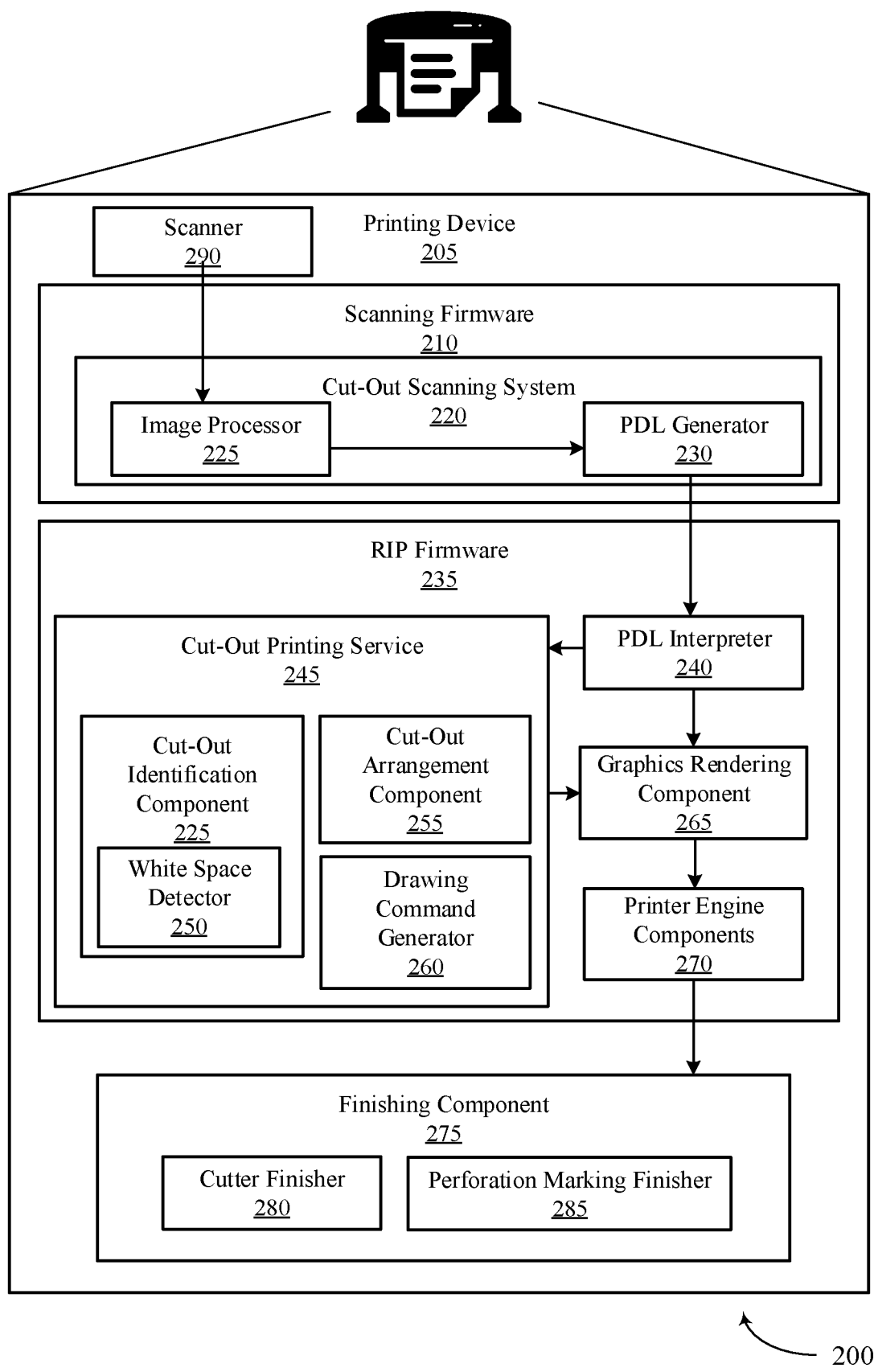
FIG. 2 shows a diagram of a Scanning/Printing System that supports receiving image files and arranging shapes within a document prior to printing cut-out images in accordance with additional aspects of the present disclosure.

Referring next to FIG. 2, a schematic diagram is shown of a Scanning/Printing System 200 that supports receiving image files and arranging shapes within a document prior to printing cut-out images in accordance with aspects of a second embodiment of the present disclosure. Scanning/Printing System 200 may include Printing Device 205.

Printing Device 205 may include Scanner 290, Scanning Firmware 210, RIP Firmware 235, and Finishing Component 275.

Scanning Firmware 210 may include Cut-Out Scanning System 220. Cut-Out Scanning System may include Image Processor 225 and a PDL Generator 230.

The RIP Firmware 235 may comprise a Cut-Out Printing Service 245, a PDL Interpreter 240, a Graphics Rendering Component 265, and Printer Engine Components 265. The Cut-Out Printing Service 245 may comprise a Cut-Out Identification Component 295, a White Space Detector 250, a Cut-Out Arrangement Component 255, and a Drawing Command Generator 260.

The Finishing Component 275 may comprise a Cutter Finisher 280 and a Perforation Marking Finisher 285.

In the embodiment shown in FIG. 2, instead of the cut-out pattern layout modules being included in the Scanning Firmware 210 the cut-out pattern layout modules are included in the Cut-Out Printing Service 245 of the RIP Firmware 235. In this embodiment, the Cut-Out Scanning System 220 will work in conjunction with the Cut-Out Printing Service 245 in the Printing Device 205 RIP Firmware 235. The Cut-Out Scanning System 220 would be a feature update to the Scanning Firmware 210 of the Printing Device 205.

The Cut-Out Scanning System 210 may include the Image Processor 225 configured to perform image processing to distinguish, identify and separate cut-out patterns from each page file in image format received from the Scanner 290.

The Cut-Out Scanning System 210 may include the PDL Generator 230 configured to create a PDL print job for each scanned page including the image data from the image processor and the cut-out patterns data from the image processor. The pages are kept intact from the initial scan, i.e. the cut-out pattern locations are not changed.

The RIP firmware 235 may include the Cut-Out Printing Service 245 configured to process the generated PDL print job and lay out the cut-out patterns in the page for optimal use of the paper.

The Cut-Out Scanning System 220 will relay the generated PDL print job to the RIP Firmware 235 for processing through the PDL Interpreter 240 and through the Cut-Out Printing Service 245. In turn, the Cut-Out Printing Service 245 will optimize the layout of the patterns in the generated PDL print job for best usage of paper material.

The PDL Interpreter 240 includes various PDL interpreters for languages like PCL 5, PCL 6 (XL), XPS, PDF, PostScript, and so on. The purpose of the PDL Interpreter 240 is to parse and translate the commands, data and features of the corresponding PDL to some intermediate format that would be understandable by the Printer Engine Components 270.

In conventional PDL interpreter processing scenarios, the interpreter will parse the incoming print job or data until it consumes all of the data. It then passes the processed data to the graphics rendering component for translation to lower-level format that the printer engine would understand. In particular, this lower-level format may be called Orderlist, a list of configuration, drawing and marking commands that are further simple and native in form for the printer engine.

Because of the need to perform the features and services provided from the Cut-Out Scanning System 220, the operation of the PDL Interpreter 240 will be updated with an additional processing step through the Cut-Out Printing Service 245. The Cut-Out Printing Service 245 will be a RIP firmware sub-component that provides service and interfaces to the PDL Interpreter 240.

In this new configuration, all incoming print data are relayed from the PDL Interpreter 240 parser to the Cut-Out Printing Service 245. The Cut-Out Printing Service 240 will be one new processing step in between the PDL Interpreter 240 and the Graphics Rendering Component 265.

The Cut-Out Printing Service 245 of FIG. 2 is provided when the Cut-Out Scanning System 220 does not include a Cut-Out Scanning Service for laying out the cut-out patterns. The Cut-Out Printing Service 245 may also pre-exist on the RIP Firmware 235 if developed through a Cut-Out Printing System (as described in the related application).

The Cut-Out Printing Service 245 is configured to identify shapes and page objects, group and sort the shapes, relocate cut-out patterns to white areas, and mark cut-out patterns for the finishing component 275. As pages are filled with sorted and grouped cut-out patterns, the page will be relayed to the Graphics Rendering Component 265 for conversion to graphics orders.

The Graphics Rendering Component 265 generates graphics orders or drawing commands that will instruct the engine to draw the page contents onto the paper. In conventional graphics rendering components in printers, print job data are PDL data to be processed through a PDL interpreter. The PDL interpreter relays configuration and drawing commands to the graphics rendering component, which then translates the data to graphics orders. The conventional graphics rendering component will essentially produce the graphics orders for the cut-out patterns that are intended to be cut out of the paper. In effect, the graphics rendering component will generate graphics orders for any and all page contents in the pages from the PDL print job.

In the embodiment of FIG. 2, the Graphics Rendering Component 265 may have the updated feature to generate new graphics orders that are instructions for the Cutter Finisher 280 and/or Perforation Marking Finisher 285 to draw, mark or cut the cut-out patterns on the printed paper. These specific instructions will not make any markings on the paper, unless they are for perforation marks. These instructions will not be performed at the main printer engine, but rather at the finishers, such as cutter finisher or perforation marking tools.

In this embodiment, the Cut-Out Printing Service 245 would have re-ordered the page contents that normally would compose a single page. Because of the operations in the Cut-Out Printing Service 245, the page contents would have been repositioned in the page, and potentially, objects from subsequent page(s) would have been relocated to a single page, due to the objectives of this invention.

The Cut-Out Printing Service 245 may have also added extra drawing commands to describe the cut-out pattern path or outline. These drawing commands could result in the Graphics Rendering Component 265 generating graphics orders for dashed lines and/or perforation marks around the cut-out patterns and in the interior white areas.

To the point-of-view of the Graphics Rendering Component 265, the cut-out patterns described and drawn from the graphics orders would still compose a single page (or other media that can be cut). The difference is that the page processed in the Graphics Rendering Component 265 would not potentially have the same layout as in the PDL print job received from PDL Generator 230 of the Cut-Out Scanning System 220.

The Printer Engine Components 270 process the graphics orders from the Graphics Rendering Component 265, and perform actual drawing and application of ink/toner onto physical paper media (or other printable media). This could potentially include rendered dashed-lines and/or perforations, if those features were enabled for the print job.

Once paper is printed on, it will be fed onto the Cutter Finisher 280 for cutting or Perforation Marking Finisher 285 for marking of perforations.

As mentioned previously, the Cut-Out Scanning System 220 will add commands to mark the cut-out path or outline for perforation or cutting. This data will be translated and processed through the Graphics Rendering Component 265, and eventually, relayed or passed down to the Finishing Component 275.

The Finishing Component comprises the Cutter Finisher 280 and the Perforation Marking Finisher 285. The Cutter Finisher 280 performs the actual cutting of the cut-out patterns generated through the Cut-Out Scanning System 220. Each cut-out pattern may enclose smaller cut-out pattern that happened to fit inside its white areas. The Perforation Marking Finisher 285 pokes or punches tiny pointed marks or holes that form perforation marks on the page. In some embodiments there are two perforation marking finisher designs developed in this invention: rollers with singles perforation pins, and rollers with multiple rows of perforation pins.

Scanning/Printing System 200 may be an example of a printing system comprising a printing device and a cut-out scanning service comprising an image processor configured to receive raw image data, identify cut-out patterns in the raw image data, and create image-formatted cut-out pattern data from the raw image data, a page description language (PDL) generator configured to receive the image-formatted cut-out pattern data and convert the image-formatted cut-out pattern data to a plurality of PDL-formatted cut-out patterns and a cut-out printing service configured to receive the plurality of PDL-formatted cut-out patterns, receive a reference to a logical page, detect white space in the plurality of PDL-formatted cut-out patterns by detecting areas with no color, optimally position the PDL-formatted cut-out patterns on the logical page, wherein the optimal positioning includes locating a PDL-formatted cut-out pattern, that fits within interior white space of another a PDL-formatted cut-out pattern, within the interior white space of the other a PDL-formatted cut-out pattern, and generate a PDL drawing command for each PDL-formatted cut-out pattern identifying an outline of the PDL-formatted cut-out pattern, including identifying where at least one of cutting and perforation will occur on the logical page.

In another embodiment the printing system further comprises a scanner configured to capture raw image data and send the raw image data to the image processor.

In yet another embodiment the cut-out printing service is further configured to generate a PDL print job including the PDL-formatted cut-out patterns optimally positioned on the logical page, and the PDL drawing commands.

In yet another embodiment the printing system further comprises a graphics rendering component configured to receive the PDL print job from the cut-out printing service and generate graphics orders based on the PDL print job.

In yet another embodiment the printing system further comprises at least one of a cutter finisher and a perforation marking tool.

Figure 3:
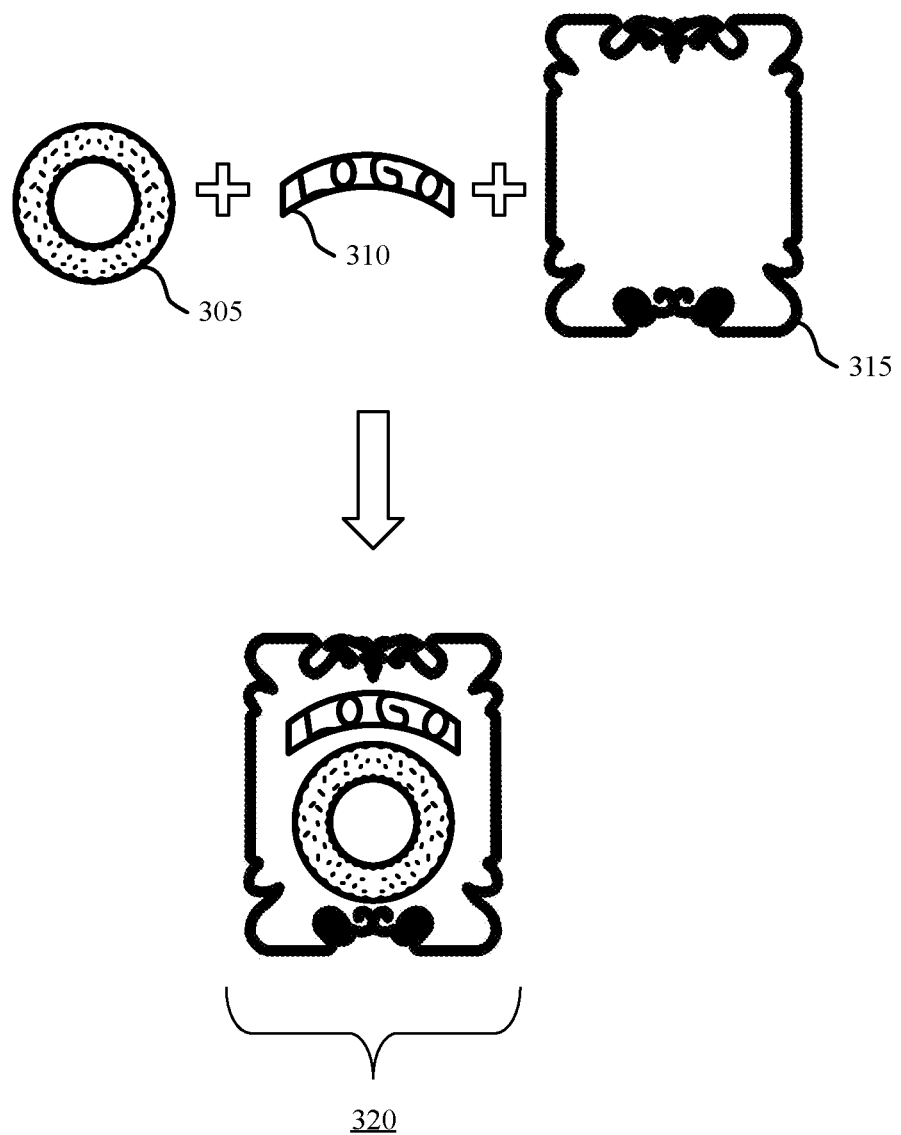
FIG. 3 shows a diagram of an example of a Cut-Out Print Arrangement based on arranging shapes within a document prior to printing the shapes in accordance with aspects of the present disclosure.

FIG. 3 shows a diagram 300 of a first example of a Cut-Out Print Arrangement based on arranging shapes within a document prior to printing the shapes in accordance with aspects of the present disclosure. The Cut-Out Print Arrangement may be executed by Cut-Out Arrangement Component 135 in the embodiment of FIG. 1 or the Cut-Out Arrangement Component 255 in the embodiment of FIG. 2. In this example, there may be three pages to be printed with different patterns or objects: a Donut 305, a Logo 210 and a Frame 315. These objects may be combined to form Cut-Out Print Arrangement 320. The Donut 305, Logo 310 and Frame 315 may each be a cut-out pattern. The Logo 310 may be cut as grouped text and not as individual letters.

A PDL Generator, through a user interface, may provide the option to cut along the outline of the full string of the Logo 310, or enclose it in a rectangular or curved shape.

Thus, the patterns from each of the three pages may be combined into one sheet if they can be arranged so that smaller shapes are fit and positioned in the white spaces of the bigger cut-out patterns to form Cut-Out Print Arrangement 320.

Figure 4:
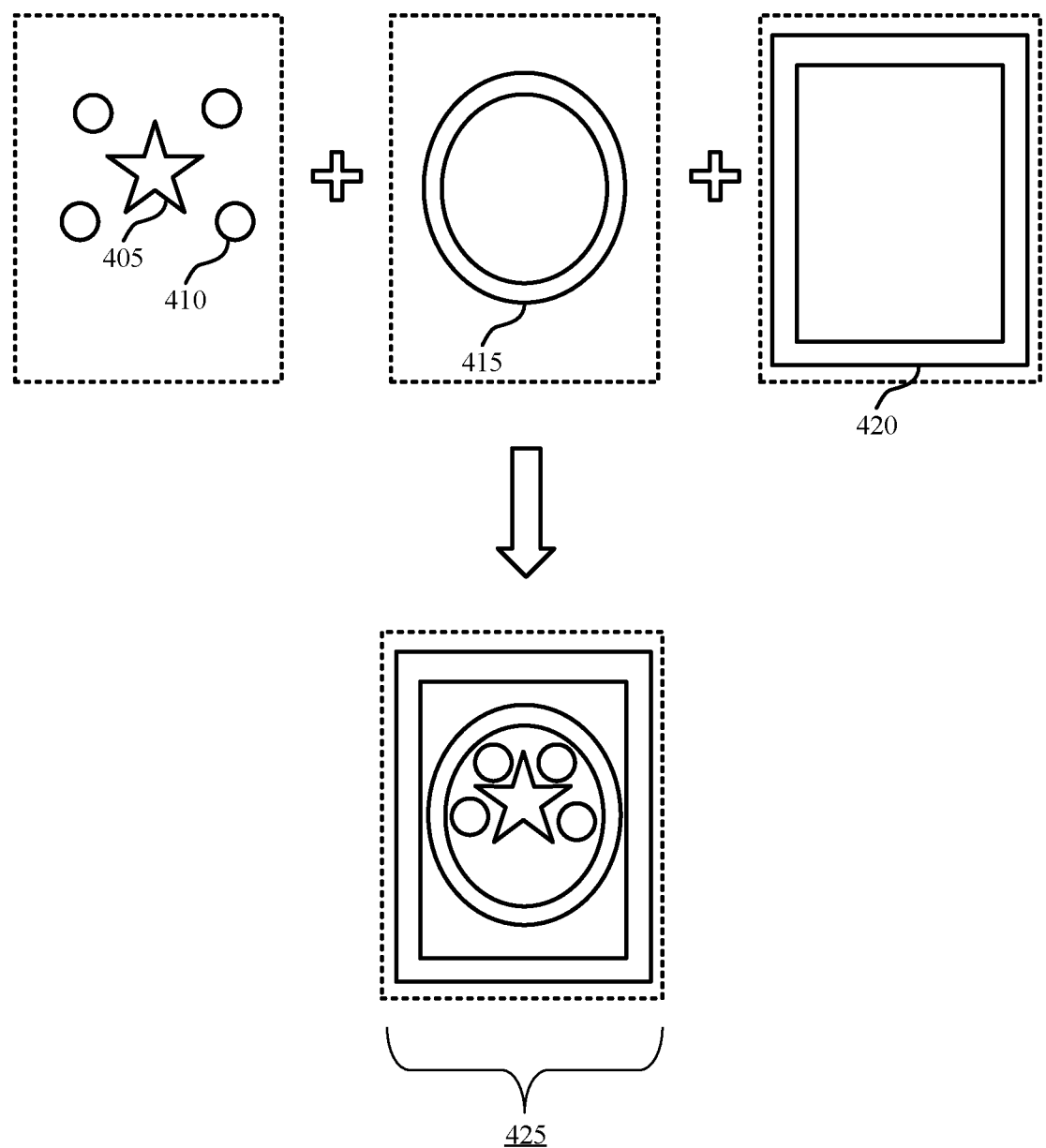
FIG. 4 shows a diagram of another example of a Cut-Out Print Arrangement based on arranging shapes within a document prior to printing cut-out images in accordance with aspects of the present disclosure.

FIG. 4 shows a diagram 400 of a second example of a Cut-Out Print Arrangement based on arranging shapes within a document prior to printing cut-out images in accordance with aspects of the present disclosure. Diagram 400 may include Star 405, Small Circles 410, Large Circle 415, and Rectangle 420. These objects may be combined to form Cut-Out Print Arrangement 425. In this example, Cut-Out Print Arrangement 425 has 4 shapes, each of which is a cut-out pattern on its own. Much paper material is wasted when these are printed on separate sheets of paper.

The following steps may be used to order the shapes from largest to smallest, including consideration and factoring of the dimension of interior white spaces. The order of patterns may be Rectangle 420, Large Circle 415, Star 405, and 4 Small Circles 410. The method may find and select the Rectangle 420 as the largest one and as one with largest white space among all the cut-out patterns, and position this rectangular frame on the logical page. The Cut-Out Arrangement Component 135, 255 may then search for next largest cut-out pattern and may find the Large Circle 415 as the next pattern to process.

The Cut-Out Arrangement Component 135, 255 may then detect the interior white space in the Rectangle 420 as available and can accommodate the circle. The Cut-Out Arrangement Component 135, 255 may then position the Large Circle 415 inside the interior white space of the Rectangle 420. The Cut-Out Arrangement Component 135, 255 may next find the Star 405 as the next largest cut-out pattern.

The Cut-Out Arrangement Component 135, 255 may then find that the white space within the Large Circle 415 can accommodate the Star 405. The Cut-Out Arrangement Component 135, 255 may then position the Star 405 in the interior white space of the circle. The Cut-Out Arrangement Component 135, 255 may then repeat this process for the Small Circles 410, and the Cut-Out Printing Service may find that they can be accommodated in the remaining white space inside the circle, but outside the area occupied by the Star 405.

If the Small Circles 410 comprises four separate cut out patterns, it is possible that the individual circles may fit in the white spaces between the Large Circle 415 and the interior edges of the Rectangle 420. If the circles do fit in the white spaces between the Larger Circle 415 and the interior edges of the Rectangle 320, the circles may be positioned in the white spaces between the Large Circle 415 and the interior edges of the Rectangle 420. It is also possible that the Star 405 may get positioned more towards the top-center, top-left or anywhere inside the white spaces of the Large Circle 415. If so, the eventual position of the Small Circles 410 may end up somewhere else in the white spaces of the Large Circle 415. Thus, only one sheet may be used for Cut-Out Print Arrangement 425 in this example.

There may be more white spaces on the entire page that could be used for additional cut-out patterns, if there is ever any more of them left in the document or print job that user designed. This shows that there is potential for great savings of recording media or printing medium for the user, for the business, and for the environment.

Figure 5:
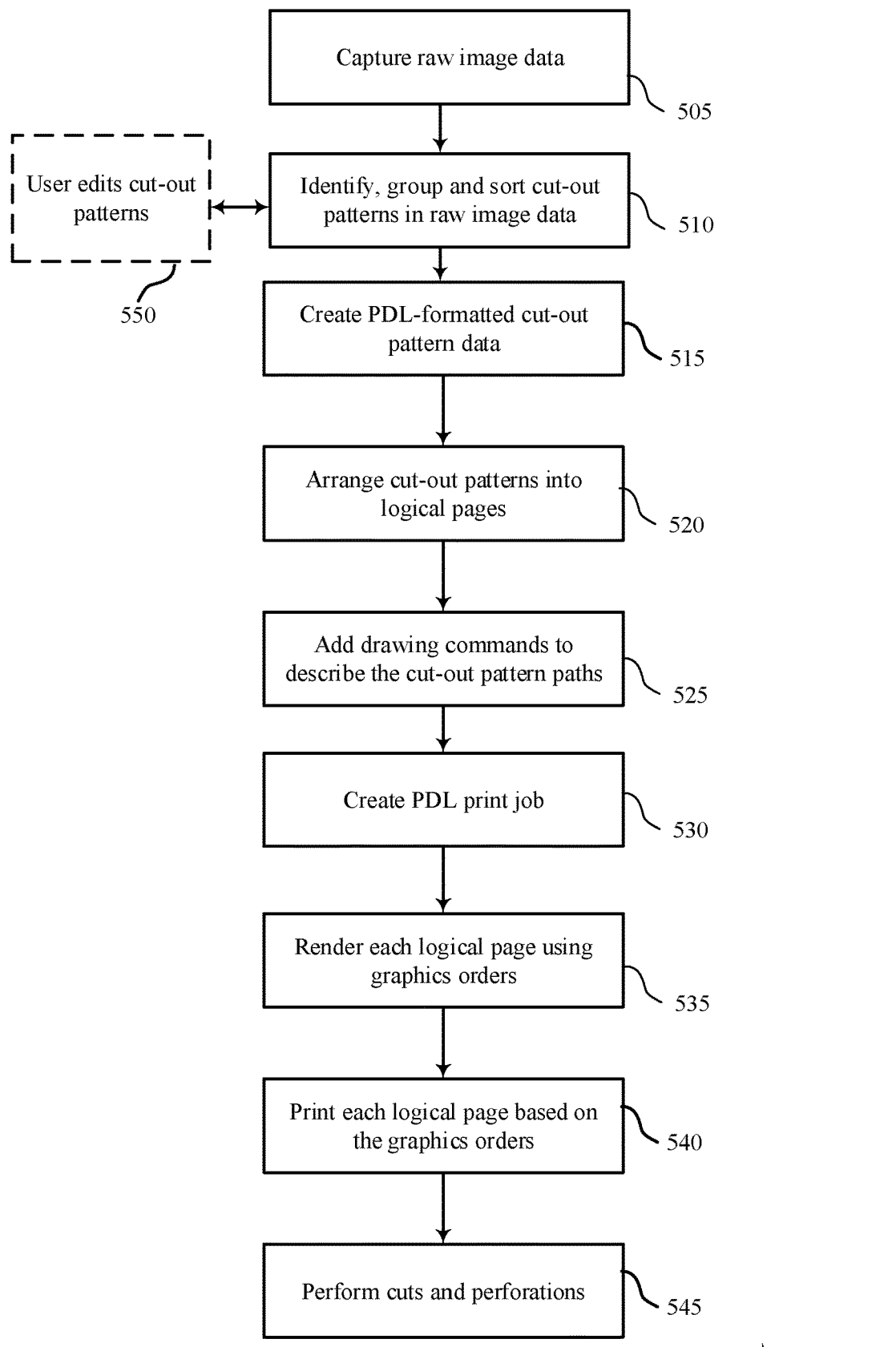
FIG. 5 shows a flowchart 500 of a process for arranging shapes within a document prior to printing cut-out images in accordance with aspects of the present disclosure.

FIG. 5 shows a flowchart 500 of a process for arranging shapes within a document prior to printing cut-out images in accordance with the Printing Device embodiment shown in FIG. 1. Specifically, flowchart 500 represents an overview of the printing process. In some examples, a Cut-Out Scanning Service may execute a set of codes to control functional elements of the Cut-Out Scanning Service to perform the described functions. Additionally, or alternatively, a Cut-Out Scanning Service may use special-purpose hardware.

At block 505 a scanner may capture raw image data. These operations may be performed according to the methods and processes described in accordance with aspects of the present disclosure. For example, the operations may be composed of various substeps or may be performed in conjunction with other operations described herein. In certain examples, aspects of the described operations may be performed by scanner 190 and scanning firmware 110 as described with reference to FIG. 1.

In some embodiments the capturing of raw image data comprises scanning of at least one hardcopy page and acquiring of a full-size rasterized image file or a pixelmap image file of each page being scanned.

At block 510, cut-out patterns in the raw image data are identified, sorted, and/or grouped. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 115 as described with reference to FIG. 1.

In some embodiments the identifying, sorting, and grouping comprises using image recognition to distinguish shapes in each scanned image page received, determine whether two or more shapes should be grouped together into a larger single cut-out pattern, and for each group of shapes determined to be grouped together into a single cut-out-pattern, create cut-out outline data for the grouped shape.

In some embodiments, determining whether shapes should be grouped together includes grouping shapes that interconnect into a single cut-out pattern. In some embodiments, determining whether shapes should be grouped together includes not grouping together shapes that have gaps or are not connected, or are separated by white areas. In some embodiments, shapes that belong inside another shape, or are surrounded by another shape, may be considered grouped into a single cut-out pattern.

Optionally, the method may use optional step 550, where the user edits the cut-out patterns. In this step the cut-out patterns are forwarded to the optional preview and marking application 195 coupled to a display of the printer 105 or to a display of a computer. The preview and marking application 195 is provided to display the groupings determined by the image processor 115 and allow the user to edit the groupings determined by the image processor 115. For example, the user may group together previously ungrouped shapes to form more complex shapes. Once the user has finished editing the cut-out patterns in step 550, the method returns to step 510 and the method proceeds using the revised cut-out patterns.

At block 515 PDL-formatted cut-out pattern data may be generated from the image-formatted cut-out pattern data. These operations may be performed according to the methods and processes described in accordance with aspects of the present disclosure. For example, the operations may be composed of various substeps or may be performed in conjunction with other operations described herein. In certain examples, aspects of the described operations may be performed by the PDL Generator 145 as described with reference to FIG. 1.

In some embodiments the generating of the PDL-formatted cut-out pattern data may include first creating a logical page, if not yet created. Second, converting the cut-out pattern data into PDL data (also referred to as print job data).

At block 520 the cut-out patterns may be arranged into logical pages. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Scanning Service 120 as described with reference to FIG. 1.

At block 525 drawing commands may be added to describe the cut-out pattern paths. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Scanning Service 120 as described with reference to FIG. 1.

In some embodiments adding drawing commands to describe the cut-out paths includes marking a cut-out path for one or more cut-out patterns on the logical page.

At block 530 a PDL print job is created. These operations may be performed according to the methods and processes described in accordance with aspects of the present disclosure. For example, the operations may be composed of various substeps or may be performed in conjunction with other operations described herein. In certain examples, aspects of the described operations may be performed by PDL Interpreter 155 as described with reference to FIG. 1.

At block 535 the logical pages may be rendered using graphics orders. These operations may be performed according to the methods and processes described in accordance with aspects of the present disclosure. For example, the operations may be composed of various substeps or may be performed in conjunction with other operations described herein. In certain examples, aspects of the described operations may be performed by Graphics Rendering Component 160 as described with reference to FIG. 1.

At block 540 each logical page may be printed based on the graphics orders. These operations may be performed according to the methods and processes described in accordance with aspects of the present disclosure. For example, the operations may be composed of various substeps or may be performed in conjunction with other operations described herein. In certain examples, aspects of the described operations may be performed by Printer Engine Components 170 as described with reference to FIG. 1.

At block 545 cuts and perforations may be performed on the printed pages. These operations may be performed according to the methods and processes described in accordance with aspects of the present disclosure. For example, the operations may be composed of various substeps or may be performed in conjunction with other operations described herein. In certain examples, aspects of the described operations may be performed by Finishing Component 175 as described with reference to FIG. 1.

Flowchart 600 may be an example of a process for printing by a printing system, comprising the steps of receiving a plurality of page description language (PDL)-formatted cut-out patterns, generating a page description language (PDL)-formatted cut-out pattern for each identified cut-out pattern, detecting white space in the plurality of PDL-formatted cut-out patterns by detecting areas with no color, optimally positioning the plurality of PDL-formatted cut-out patterns on a logical page, wherein the optimal positioning includes locating a PDL-formatted cut-out pattern, that fits within interior white space of another PDL-formatted cut-out pattern, within the white space of that PDL-formatted cut-out pattern, and generating a PDL drawing command for each PDL-formatted cut-out pattern identifying an outline of the PDL-formatted cut-out pattern identifying where at least one of cutting and perforation will occur on the logical page.

In another embodiment the process includes receiving image-formatted cut-out pattern data and converting the image-formatted cut-out pattern data to PDL-formatted cut-out patterns.

In yet another embodiment the process further includes receiving raw image data, identifying cut-out patterns in the raw image data, and creating the image-formatted cut-out pattern data from the raw image data.

In yet another embodiment the process further includes capturing the raw data.

In yet another embodiment the process further includes identifying of an initial set of identified cut-out patterns, viewing, by a user, of the raw image data and the initial set of identified cut-out patterns, and editing, by the user using an interactive application of the printing system, of the initial set of identified cut-out patterns.

In yet another embodiment the process further includes creating a PDL print job including the PDL-formatted cut-out patterns optimally positioned on the logical page, and the PDL drawing commands.

In yet another embodiment the process further includes receiving of the PDL print job by a raster image processing (RIP) service of the printing system.

Figure 6:
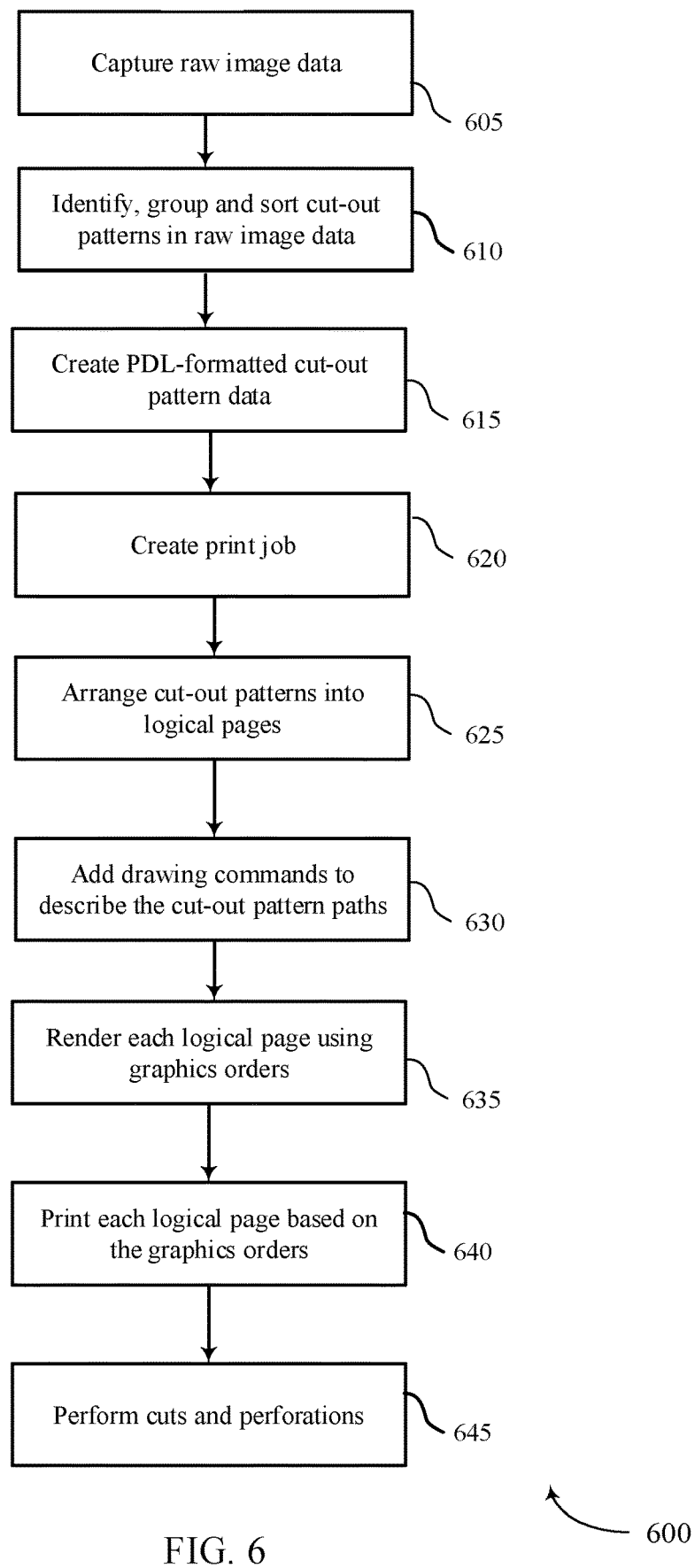
FIG. 6 shows a flowchart 600 of a process for arranging shapes within a document prior to printing cut-out images in accordance with aspects of the present disclosure.

FIG. 6 shows a flowchart 600 of a process for arranging shapes within a document prior to printing cut-out images in accordance with the Printing Device embodiment shown in FIG. 2. Specifically, flowchart 600 represents an overview of the printing process. In some examples, a Cut-Out Scanning System and/or a Cut-Out Printing Service may execute a set of codes to control functional elements of the Cut-Out Scanning System or Cut-Out Printing Service to perform the described functions. Additionally, or alternatively, a Cut-Out Scanning System and/or a Cut-Out Printing Service may use special-purpose hardware.

At block 605 the Printing Device may capture raw image data. These operations may be performed according to the methods and processes described in accordance with aspects of the present disclosure. For example, the operations may be composed of various substeps or may be performed in conjunction with other operations described herein. In certain examples, aspects of the described operations may be performed by scanner 290 and scanning firmware 210 as described with reference to FIG. 2.

In some embodiments the capturing of raw image data comprises scanning of at least one hardcopy page and acquiring of a full-size rasterized image file or a pixelmap image file of each page being scanned.

At block 610, cut-out patterns in the raw image data are identified, sorted, and/or grouped. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 225 as described with reference to FIG. 2.

In some embodiments the identifying, sorting, and grouping comprises using image recognition to distinguish shapes in each scanned image page received, determine whether two or more shapes should be grouped together into a larger single cut-out pattern, and for each group of shapes determined to be grouped together into a single cut-out-pattern, create cut-out outline data for the grouped shape.

In some embodiments, determining whether shapes should be grouped together includes grouping shapes that interconnect into a single cut-out pattern. In some embodiments, determining whether shapes should be grouped together includes not grouping together shapes that have gaps or are not connected, or are separated by white areas. In some embodiments, shapes that belong inside another shape, or are surrounded by another shape, may be considered grouped into a single cut-out pattern.

At block 615 PDL-formatted cut-out pattern data may be generated from the image-formatted cut-out pattern data. These operations may be performed according to the methods and processes described in accordance with aspects of the present disclosure. For example, the operations may be composed of various substeps or may be performed in conjunction with other operations described herein. In certain examples, aspects of the described operations may be performed by the PDL Generator 230 as described with reference to FIG. 2.

In some embodiments the generating of the PDL-formatted cut-out pattern data may include first creating a logical page, if not yet created. Second, converting the cut-out pattern data into PDL data (also referred to as print job data).

At block 620 the PDL-formatted cut-out data generated in step 615 is parsed and translated the commands, data, and features of the corresponding PDL-formatted data to a format that will be understood by the printer. These operations may be performed according to the methods and processes described in accordance with aspects of the present disclosure. For example, the operations may be composed of various substeps or may be performed in conjunction with other operations described herein. In certain examples, aspects of the described operations may be performed by the PDL Interpreter 240 as described with reference to FIG. 2.

At block 625 the parsed print job data from step 620, such as PDL commands, page content data, (text, images, shapes, etc.) and the cut-out patterns are arranged into new logical pages. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 245 as described with reference to FIG. 2.

The arrangement of the cut-out patterns into logical patterns may include gathering the current page location of each cut-out pattern. The arrangement of the cut-out patterns may include determining white areas within the cut-out patterns, sorting the cut-out patterns based on size of white area within the cut-out pattern, and re-processing and re-arranging the cut-out patterns to maximize the number of patterns on each logical page and locate smaller cut-out patterns within available white areas of other cut-out patterns.

The arrangement of the cut-out patterns effectively compresses the page content into a smaller space on the page. It is possible in some cases group cut-out patterns from multiple pages into one page, thereby maximizing use of paper.

At block 630 drawing commands may be added to describe the cut-out pattern paths. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 245 as described with reference to FIG. 2.

In some embodiments adding drawing commands to describe the cut-out paths includes marking a cut-out path for one or more cut-out patterns on the logical page. In some embodiments the additional drawings commands serve as data for processing through a Graphics Rendering Component such as the Graphics Rendering Component 265 shown in FIG. 2.

At block 635 the logical pages may be rendered using graphics orders. These operations may be performed according to the methods and processes described in accordance with aspects of the present disclosure. For example, the operations may be composed of various substeps or may be performed in conjunction with other operations described herein. In certain examples, aspects of the described operations may be performed by Graphics Rendering Component 265 as described with reference to FIG. 2.

In some embodiments the rendering of the logical pages includes generating new graphics instructions for a finishing tool to draw, mark, or cut-out patterns on the printed paper. These instructions would not be performed at the main printer engine, but rather at the finishing tools, for example at the Cutter Finisher 280 and/or the Perforation Marking Finisher 285.

In the process of FIG. 6, in step 625 the page contents that would normally have composed a single page would have been re-ordered. The page contents would have been repositioned in the page, and, potentially, objects from subsequent page(s) would have been located to a single page due to the objectives of this invention. Extra drawing commands generated in step 630 could result in generating graphics orders for dashed lines and/or perforation marks around the cut-out patterns and in the interior white areas. The cut-out patterns described and drawn from the generated graphics orders would compose a single page (or other media that can be cut). The difference is that the page layout after generating the graphics orders in step 625 would not have the same layout as in the PDL print job generating in step 615.

At block 640 each logical page may be printed based on the graphics orders. These operations may be performed according to the methods and processes described in accordance with aspects of the present disclosure. For example, the operations may be composed of various substeps or may be performed in conjunction with other operations described herein. In certain examples, aspects of the described operations may be performed by Printer Engine Components 270 as described with reference to FIG. 2.

At block 645 cuts and perforations may be performed on the printed pages. These operations may be performed according to the methods and processes described in accordance with aspects of the present disclosure. For example, the operations may be composed of various substeps or may be performed in conjunction with other operations described herein. In certain examples, aspects of the described operations may be performed by Finishing Component 275 as described with reference to FIG. 2.

Flowchart 700 may be an example of a process for printing by a printing system, comprising the steps of receiving of raw image data, identifying cut-out patterns in the raw image data, creating image-formatted cut-out pattern data from the raw image data, converting the image-formatted cut-out pattern data to a plurality of PDL-formatted cut-out patterns, receiving a reference to a logical page, detecting white space in the plurality of PDL-formatted cut-out patterns by detecting areas with no color, optimally positioning the PDL-formatted cut-out patterns on the logical page, wherein the optimal positioning includes locating a PDL-formatted cut-out pattern, that fits within interior white space of another a PDL-formatted cut-out pattern, within the interior white space of the other a PDL-formatted cut-out pattern, and generating a PDL drawing command for each PDL-formatted cut-out pattern identifying an outline of the PDL-formatted cut-out pattern identifying where at least one of cutting and perforation will occur on the logical page.

In another embodiment the process further comprises capturing the raw image data.

In yet another embodiment the process further comprises the step of generating a PDL print job including the PDL-formatted cut-out patterns optimally positioned on the logical page, and the PDL drawing commands.

In yet another embodiment the process further comprises the step of generating graphics orders based on the PDL print job.

In yet another embodiment the process further comprises the step wherein the graphics orders include orders for rendering of the cut-out patterns and for at least one of cutting and perforating.

In yet another embodiment the process further comprises the steps of sending the graphics orders to a printing device, and printing by the printing device of the graphics orders onto physical media.

In yet another embodiment the process further comprises the steps of relaying of the graphics orders for at least one of cutting and perforating to at least one of a cutter finisher and a perforation marking tool; and performing at least one of cutting and perforating on the physical media.

Figure 7:
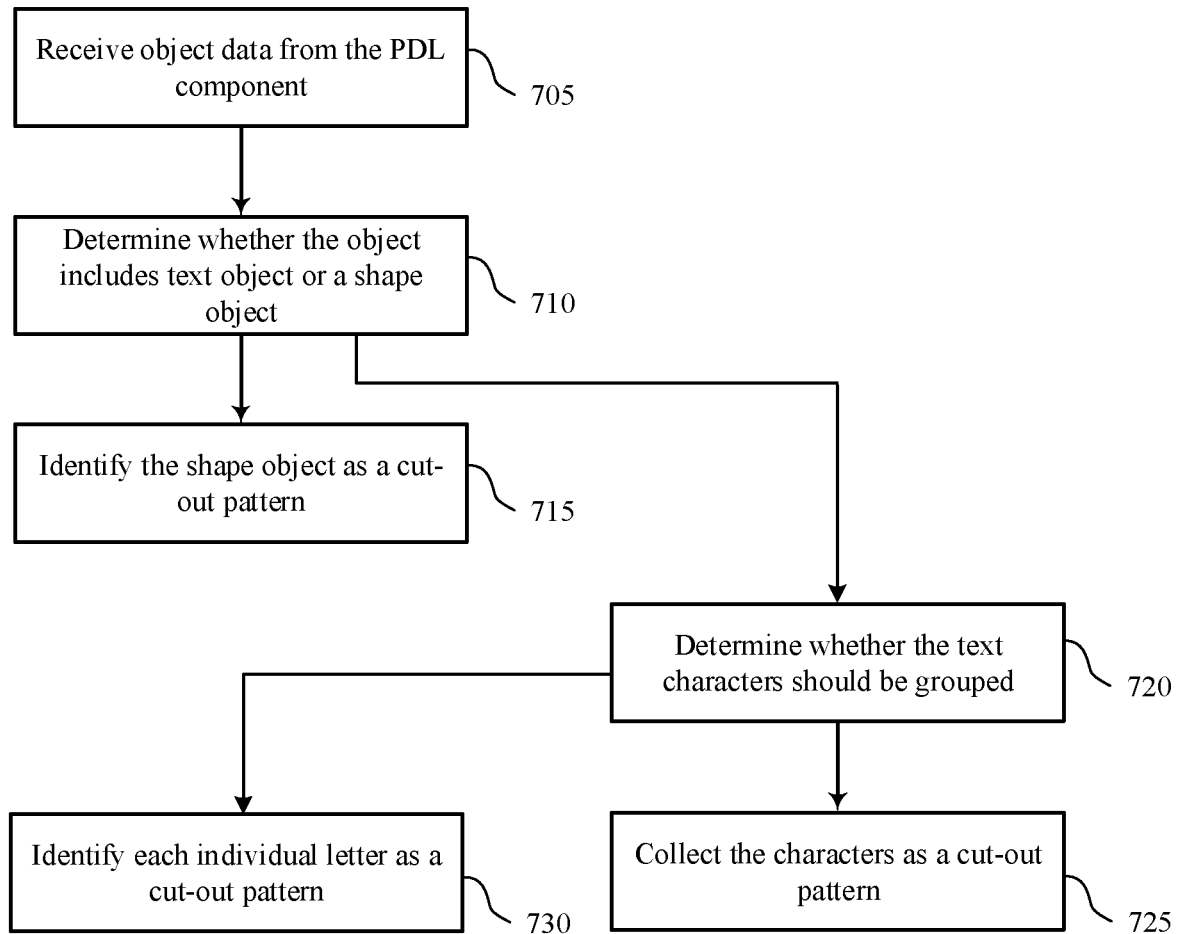
FIG. 7 shows a flowchart of a process for arranging shapes within a document prior to printing cut-out images in accordance with aspects of the present disclosure.

FIG. 7 shows a flowchart 700 of a process for arranging shapes within a document prior to printing cut-out images in accordance with the printing device embodiment shown FIG. 2. Specifically, flowchart 700 represents an overview of the printing process. In some examples, a Cut-Out Printing Service may execute a set of codes to control functional elements of the Cut-Out Printing Service to perform the described functions. Additionally, or alternatively, a Cut-Out Printing Service may use special-purpose hardware.

At block 705 a Cut-Out Printing Service or Cut-Out Scanning Service may receive object data. These operations may be performed according to the methods and processes described in accordance with aspects of the present disclosure. For example, the operations may be composed of various substeps or may be performed in conjunction with other operations described herein. In certain examples, aspects of the described operations may be performed by the Cut-Out Printing Service 2245 as described with reference to FIG. 2.

At block 710 the Cut-Out Printing Service may determine whether the object data comprises text object or an image/shape object. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 225 as described with reference to FIG. 2. If the object comprises a shape or image the process may proceed to block 715, otherwise (i.e., if the object includes text) the process may proceed to block 720.

At block 715, if the object comprises a shape or image, the Cut-Out Printing may identify the shape object as a cut-out pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 225 as described with reference to FIG. 2.

At block 720, if the object includes text, the Cut-Out Printing Service may determine whether the text characters should be grouped. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 225 as described with reference to FIG. 2. If the characters are intended to be grouped, the process may proceed to block 725. Otherwise, the process may proceed to block 730.

At block 725, if the text characters are intended to be grouped, the Cut-Out Printing Service may collect the characters as a cut-out pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 225 as described with reference to FIG. 2.

At block 730, if the characters are not intended to be grouped, the Cut-Out Printing Service may identify each individual letter or symbol (or text character) as a cut-out pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 225 as described with reference to FIG. 2.

Thus, any marked page contents on the page may be considered cut-out patterns to be cut from paper. Each letter, symbol, or text character, however small, could be a cut-out pattern by itself. This is a feature supported by default in the Cut-Out Printing Service. However, in many cases, individual page contents may not be meant to be cut out separately. For example, each letter in a string may not be cut out as separate letters but instead may be cut out as a string of letters, symbols, or text characters (together referred to as single tokens). It would be groups of letters or strings that would have more practical use as a single cut-out pattern.

Another example is a string enclosed in a rectangular box. The outline of the box may not be intended to be cut separately, nor the letters within the box to be cut out individually. Instead, the rectangular box and the contained string may be cut as a single cut-out pattern. Thus, the Cut-Out Printing Service may distinguish the white space inside the rectangular box, based on whether the white space is part of the cut-out pattern or not. That is, some areas can be assigned to be non-white spaces, and they may be detected and treated as actual data and part of the cut-out pattern. One method of specifying these non-white spaces may be to add a white color or 100% transparency on the space and surrounding the text. By using a white color or 100% transparency, the white spaces can be detected and identified as not a real white space or unused space. Rather, those areas can be assigned to non-white spaces, and they would be detected and treated as actual data and part of the cut-out pattern.

In some cases, additional features for a PDL Generator may be developed to mark individual letters or characters in a string, or to group letters as a single cut-out pattern, or to group patterns, images, and other types of page content as a group of images that are not to be cut out individually. In this alternative embodiment, the PDL Generator can allow for the choosing of outline shapes that may serve as the path for the cutter or perforation marking tools.

In yet another example, it is possible to add a user interface in a printer panel (i.e. a user interface panel of the printer) or connected computing device to allow a user to selected groups of text, objects, or shapes as grouped or single cut-out patterns.

Figure 8:
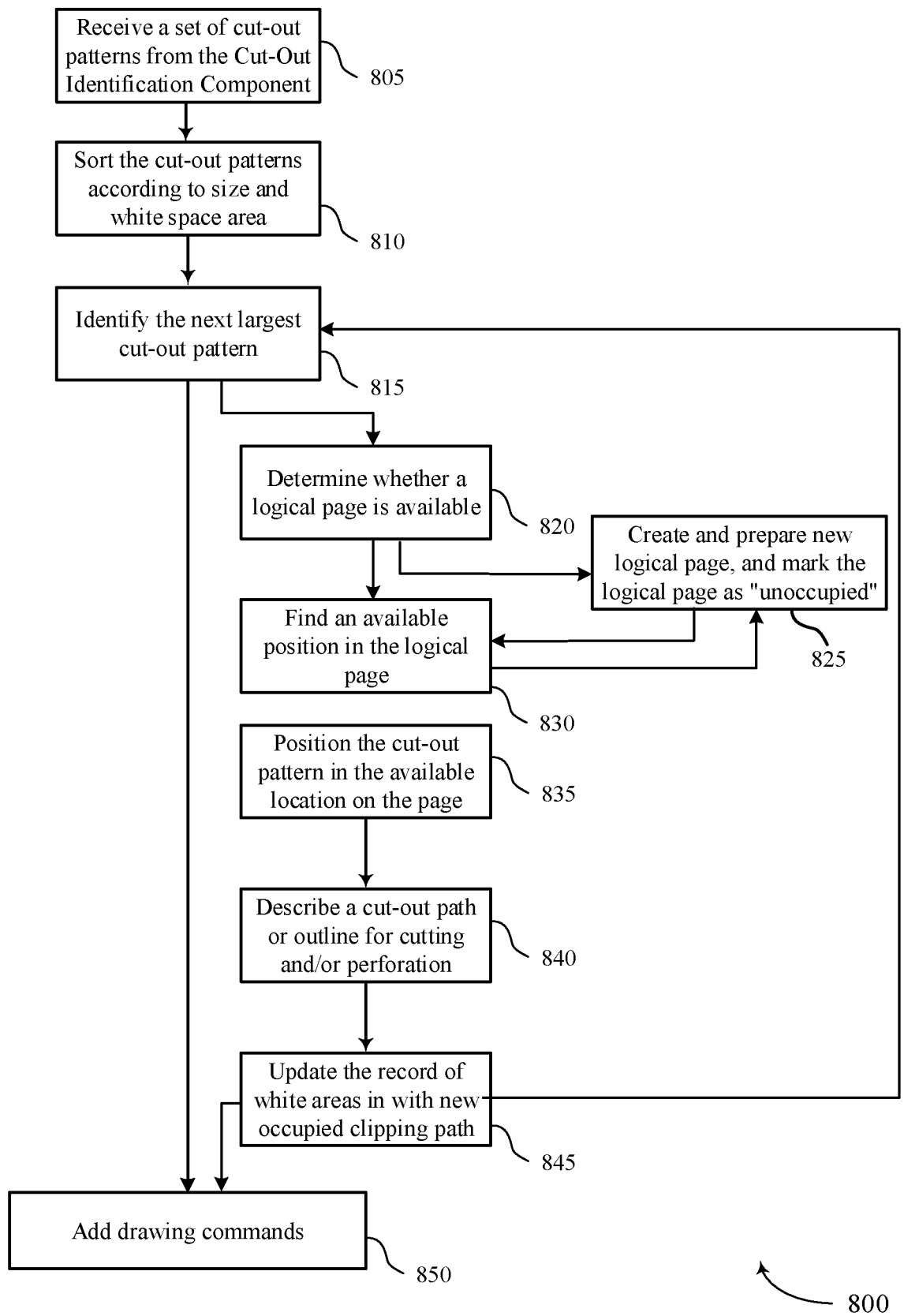
FIG. 8 shows a flowchart of a process for arranging shapes within a document prior to printing cut-out patterns in accordance with aspects of the present disclosure.

FIG. 8 shows a flowchart 800 of a process for arranging shapes within a document prior to printing cut-out patterns in accordance with aspects of the present disclosure. Specifically, flowchart 800 represents a method of arranging cut-out patterns into a compact printing area. The method of arranging the cut-out patterns may be executed by the Cut-Out Printing Service 245 of FIG. 2. In some examples, a Cut-Out Printing Service may execute a set of codes to control functional elements of the Cut-Out Printing Service to perform the described functions. Additionally, or alternatively, a Cut-Out Printing Service may use special-purpose hardware.

At block 805 the Cut-Out Printing Service may receive a set of cut-out patterns (e.g., from the Cut-Out Identification Component). These operations may be performed according to the methods and processes described in accordance with aspects of the present disclosure. For example, the operations may be composed of various substeps or may be performed in conjunction with other operations described herein. In certain examples, aspects of the described operations may be performed by the Cut-Out Arrangement Component 255 as described with reference to FIG. 2. If there are cut-out patterns to arrange, the process may proceed to block 810, otherwise, the process may proceed to block 850.

At block 810 the Cut-Out Printing Service may sort the cut-out patterns according to size and white space. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 225 or Cut-Out Arrangement Component 295 as described with reference to FIG. 2.

At block 815 the Cut-Out Printing Service may identify the next largest cut-out pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 255 as described with reference to FIG. 2. If there are no more cut-out patterns, the process may proceed to block 850. If the next largest cut-out pattern is identified, the process may proceed to block 820.

At block 820 the Cut-Out Printing Service may determine whether a logical page is available. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 255 as described with reference to FIG. 2. If no logical page is available, the process may proceed to block 825. If a logical page is available, the process may proceed to block 830.

At block 825, if no logical page is available, the Cut-Out Printing Service may create and prepare a new logical page, and mark the logical page as "unoccupied." These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 255 as described with reference to FIG. 2.

At block 830, if a logical page is available and unoccupied, the Cut-Out Printing Service may find an available position (white space) on the logical page. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 255 as described with reference to FIG. 2. If no position is available, the process may return to block 825. If a position is available, the process may proceed to block 835.

At block 835, if a position is available, the Cut-Out Printing Service may position the cut-out pattern in the available location. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 255 as described with reference to FIG. 2.

At block 840 the Cut-Out Printing Service \may describe a cut-out path or outline for cutting and/or perforation. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 255 as described with reference to FIG. 2.

At block 845 the Cut-Out Printing may create a record of white space in with the newly occupied cut-out pattern and/or cut-out path, or update the record of white space if the record already exists. The record of white space is a record of the extent of the white space. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 255 as described with reference to FIG. 2.

At block 850 Cut-Out Printing Service may add drawing commands. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 260 as described with reference to FIG. 2.

During the processing of the data through the Cut-Out Printing Service, all cut-out patterns that are identified may be cached and gathered in internal memory, in an array, list, tree, hash table or other suitable data structure, or saved to disk or other location. Each cut-out pattern may be cached or saved with a reference counter, in case the exact same cut-out pattern is re-used on the same page or other pages. This may save memory for the processing of the entire print job.

Once all pages or series of pages are processed, the cut-out patterns that were cached or saved may be sorted. The purpose of the sorting is to find and fit the smaller cut-out patterns to fill the interior white spaces of larger cut-out patterns. In some cases, it is possible that there are no cut-out patterns with interior white spaces that can contain smaller cut-out patterns. In such cases, the Cut-Out Printing Service may fit as many cut-out patterns in the available spaces in the page as possible.

Once the Cut-Out Printing Service determines that all cut-out patterns are just big enough to fit in the page (i.e., that no other cut-out pattern may fit in the same page), it may proceed to filling the next page. In some cases, individual sheets may be used for printing each cut-out pattern. In other cases, where there are white spaces within cut-out patterns, the white spaces may be used and filled with smaller cut-out patterns and may result in optimal use of paper material.

After the cut-out patterns are identified, and prior to re-arranging the cut-out patterns to maximize use of white spaces, the cut-out patterns may be sorted first from largest to smallest dimension as first criterion, and largest to smallest interior white space as second criterion. It will be appreciated that other methods for ordering of the cut-out patterns may be used to optimize search for cut-out patterns that are to be re-positioned or re-located on the page.

In some cases, a PDL Generator may be set to mark cut-out patterns as they are generated. As the PDL Generator generates the patterns, it can fill a table-of-contents or index table that reflects the ordering of the patterns from largest to smallest, including sorting based on the sizes of the respective white areas in each pattern.

After the cut-out patterns are sorted, the Cut-Out Printing Service may find the next largest cut-out pattern (P). If none are found, the Cut-Out Printing Service may check if some cut-out patterns have been positioned in the current page, and eject the page from the printer, then exit the process, as all cut-out patterns were processed or there is no cut-out pattern found in this print job.

If there is no logical page (LP), a new logical page is created and prepared, and the entire page is marked as Unoccupied or available.

Next, the Cut-Out Printing Service may find a location (L) in LP where P can fit. Location L can be inside white space (interior white space) of another cut-out pattern (P_prior) that was previously positioned in LP, or an unoccupied space (white space) in LP. In some cases, the Cut-Out Printing Service may search through all interior white spaces inside P_prior that are already in LP. If there is no P_prior with interior white space that can accommodate P, then it may search available white spaces in LP that are not inside to P_priors. If there is no L found, this means that P cannot be accommodated anywhere in LP. If so, the Cut-Out Printing Service may defer positioning of P to subsequent pages. In this case, the Cut-Out Printing Service may process the next largest cut-out pattern (smaller than P). In some cases, the search may be set to begin on remaining cut-out patterns that are smaller than P. This recursion may allow for finding of the next largest cut-out patterns and their placement inside white areas of previously positioned P_priors. If there are no white spaces inside P_priors, these subsequent cut-out patterns may be placed in white spaces in LP.

Next, the Cut-Out Printing Service may position P in L of LP. The record of white space is then updated to remove the space occupied by P in LP. As a result, a custom path is added in LP that serves as a clipping path (CP), to tell the system not to position subsequent cut-out patterns in the occupied space. This list of clipping paths (LCP) may be used for searching LP for L. Occupied spaces may be marked with CPs to exclude or disqualify those areas for use in positioning P.

Finally, the Cut-Out Printing Service may return to the first step (i.e., find the next largest cut-out pattern). The search may be reset to the start of a list of cut out patterns that have not been located on LPs. This recursion may allow for positioning of all cut-out patterns in the print job.

Figure 9:
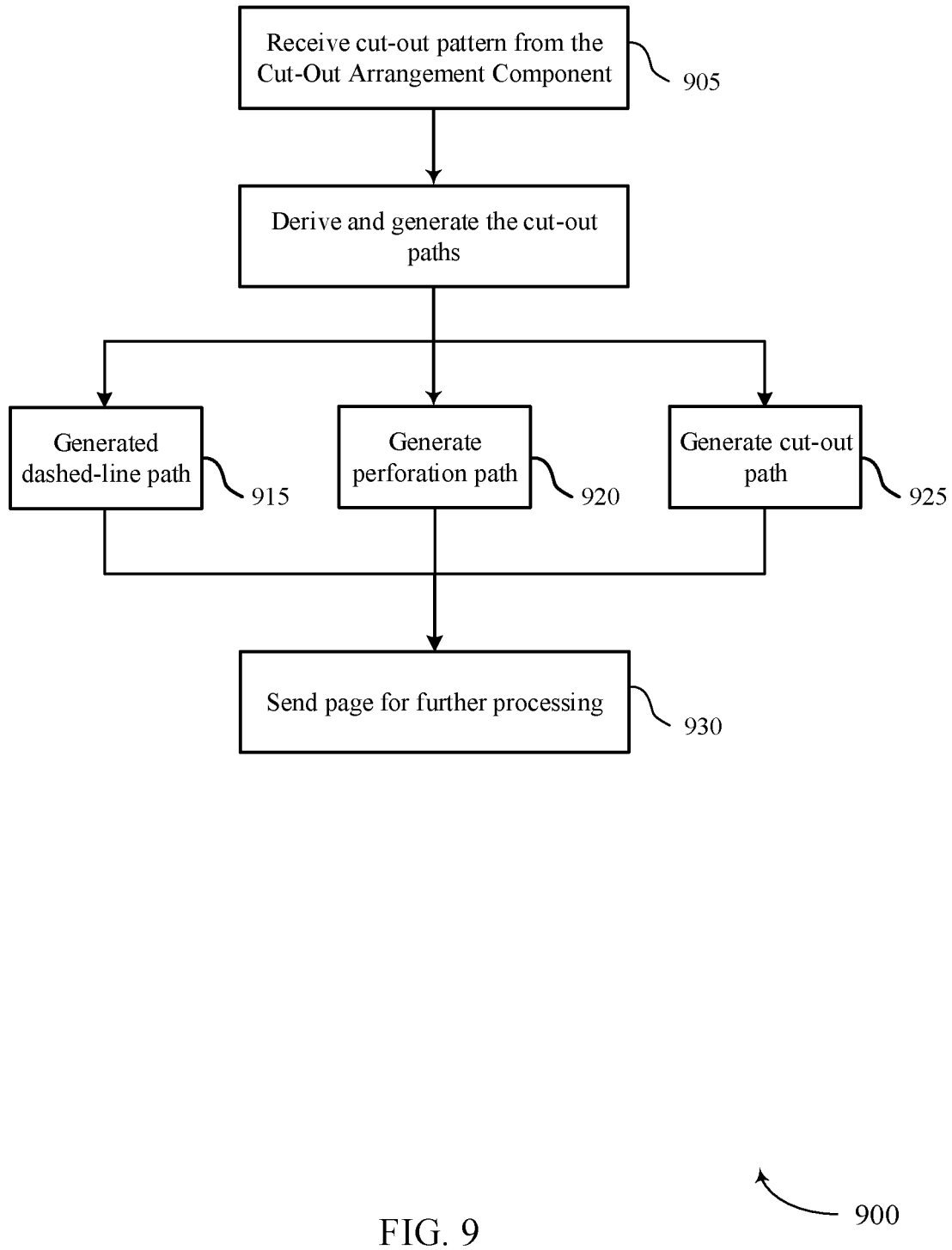
FIG. 9 shows a flowchart of a process for arranging images, shapes or cut-out patterns within a document prior to printing cut-out patterns in accordance with aspects of the present disclosure.

FIG. 9 shows a flowchart 900 of a process for arranging images, shapes or cut-out patterns within a document prior to printing cut-out patterns in accordance with aspects of the present disclosure. Specifically, flowchart 900 represents a method of marking Cut-Out Patterns for graphics rendering and finishing. In some examples, the method of marking Cut-Out Patterns for graphics rendering and finishing may be executed by Cut-Out Printing Service 245 of FIG. 2. In some examples, a Cut-Out Printing Service may execute a set of codes to control functional elements of the Cut-Out Printing Service to perform the described functions. Additionally, or alternatively, a Cut-Out Printing Service may use special-purpose hardware.

At block 905 the Cut-Out Printing Service may receive cut-out pattern from the Cut-Out Arrangement Component. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 260 as described with reference to FIG. 2.

At block 910 the Cut-Out Printing Service may derive and generate the cut-out paths. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 260 as described with reference to FIG. 2. After block 910, the process may proceed to block 915, block 920, or block 925 based on whether the cut-out patterns are to be outlined by dashed lines, perforation cutting lines, or complete cutting lines.

At block 915 the Cut-Out Printing Service may generate a dashed-line path. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 260 as described with reference to FIG. 2.

At block 920 the Cut-Out Printing may generate perforation path. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 260 as described with reference to FIG. 2.

At block 925 the Cut-Out Printing may generate cut-out path. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 260 as described with reference to FIG. 2.

At block 930 the Cut-Out Printing Service may send the page for further processing. These operations may be performed according to the methods and processes described in accordance with aspects of the present disclosure. For example, the operations may be composed of various substeps or may be performed in conjunction with other operations described herein. In certain examples, aspects of the described operations may be performed by Drawing Command Generator 260 as described with reference to FIG. 2.

The sorted patterns generated by the Cut-Out Printing Service may not be sufficient for the actual cutting or marking of perforations in the paper material. For example, there may be no data yet that would tell the cutter finisher or perforation marking finisher how or where to perform the cutting or perforation marking operations on the paper. However, there may be cut-out patterns on the paper, e.g., the edges of cut-out patterns, whether interior or exterior on the cut-out patterns, that would not indicate to the finishers where to perform the cutting or per formation making operations, e.g., a prescribed distance from the edges of the cut-out patterns.

The output data from the sorting process may include the cut-out patterns, images or shapes that describe the occupied or unoccupied spaces on the logical page. For example, the output data may define a clipping path at a prescribed distance from the edge of the cut-out pattern. Such data may serve as the parameter for drawing dashed lines, and as parameters for cutting and perforation marking tools. These paths or shapes may be called cut-out paths. In some cases, this data may represent the outline of the outermost shape of a cut-out pattern. In general, it may also include the interior white spaces of the cut-out patterns. The cut-out path data may come from the list of clipping paths.

In some examples, cut-out paths may consist of the exterior perimeter and the interior perimeter of the rectangular frame. There may also be a cut-out path for the exterior and interior circumferences or circular white spaces.

In some examples, a printer driver or document editing applications may define the cut-out path as an external invisible shape or outline that enclose the cut-out patterns. The cut-out path generated in this example could serve as margins forming the shape of a square, rectangular, or other shapes around the cut-out pattern. The cut-out path can also be an irregular shape vector path around the cut-out pattern. Thus, printer-driver or application generated cut-out paths may have no white-spaces (i.e., everything within the cut-out path would be part of the cut-out pattern). The external invisible shape may serve as the path or shape for use in Graphics Rendering Component for drawing dashed lines, or to be followed and cut through the Cutting Finisher, or for marking by the Perforation Marking Finisher.

In some examples, where the PDL Generator can identify white spaces in the interior of the cut-out patterns, even when there is an external invisible cut-out path enclosing the cut-out pattern, those identified white areas can also serve and be used as a cut-out path. In effect, the Cut-Out Printing Service or Cut-Out Scanning Service may generate cut-out paths describing the cut-out patterns and all interior white spaces or unused white areas.

The cut-out paths may be any kind of shapes, in simple or complex configurations. These can be squares, circles, triangles, curves, and other irregular shapes, especially text for banners, logos, symbols, animal or people pictures, and so on. The cut-out paths may be definitions of these shapes and arranged in an optimal path for the cutting or perforation marking. The cut-out paths could also be generated using a mathematical formula (e.g., Bezier curves), or as custom vector paths, or other optimal definition of shapes, with specification for coordinates, angles, length, and other dimensional or geometrical parameters. In some cases, these can be a mixture of formulas like Bezier curves (with coordinates and required parameters for the formula) and simple shapes/paths. The Cutting Finisher and Perforation Marking Finisher may use the cut-out paths as data for drawing of dashed lines or as input to perform the actual cutting and/or marking of perforations around or within the cut-out patterns.

In some cases, the Cut-Out Printing Service or Cut-Out Scanning Service may draw dashed lines instead of actual cutting or adding of perforation marks. Dashed lines may be additional markings on the paper that show where cutting with scissors could be done on the printout after it is printed out of the paper. The system may generate a special case of a cut-out path, called dashed-line path. A dashed-line path may fall on the exact outline of the cut-out patterns or 1-pixel or some distance away or off of the cut-out pattern depending on the design of the pattern and desire of the user. In other words, the distance of the dashed lines from the outline (or edges) of the cut-out pattern can be configured through the use of job parameters like printer job language (PJL) parameters or print tickets. Example PJL job parameters can be a dashed line distance parameter, where the value of the parameter represents the pixel distance outside or away from the outline of the cut-out pattern. It must start from 1-pixel distance away from the outline so that the dashed line may be visible on the printout and not overlap with the pattern.

This sub-method for adding safe distance for dashed lines also applies for perforation marks. It may be desired that the perforation marks are outside and not exactly on the exterior and interior outlines of the cut-out patterns and its white spaces. For example, the perforation path can be 1-pixel away from the outlines, or some configuration distance as may be desired by the user through configuration or print job parameters. A perforation distance parameter can be used for specifying this distancing adjustment. In some cases, the perforation marks may be on the exact edges of the outline of shapes or cut-out pattern. In this case, the value of the perforation distance parameter may be 0.

As an example, after the cut-out patterns are generated, the Cut-Out Printing Service or Cut-Out Scanning Service may derive and generate the cut-out paths from the cut-out pattern shape data. If generating dashed lines, define a dashed-line path shape (i.e., 1-pixel or some configurable distance outside of the outline or exterior of the shape data of the cut-out pattern). This shape may be a graphics order or another command that draws dashed lines (or other symbols that serves the purpose and implies cutting lines) around the cut-out pattern.

If generating perforation marks, the Cut-Out Printing Service or Cut-Out Scanning Service may define a cut-out path similar to the method for dashed lines. In some cases, a perforation path may be on the exact outline of the cut-out pattern, or at 1-pixel or other distance away from the outlines. This distance can be based on the sharpness and width of the perforation marking tool.

If not generating dashed lines nor perforation marks, the Cut-Out Printing Service or Cut-Out Scanning Service may generate the general cut-out path. The cut-out path can be in the exact interior and exterior outlines of the cut-out pattern. In some cases, the Cut-Out Printing Service or Cut-Out Scanning Service may allow for adjustment of the cut-out path to be 1-pixel or some configurable distance away from the outline of the cut-out pattern. This may depend on the sharpness and width of the blade in the cutting finisher.

A hybrid method may include the combination of a regular cut-out path for the cutting finisher and dashed lines or perforation marks within the cut-out pattern. Such dashed-lines or perforation marks can serve as paths or shapes on which the cut-out pattern could be folded or cut after the cut-out pattern is cut from the paper. This can be accomplished by adding job parameters or print tickets that describe that interior white spaces or cut-out patterns within larger cut-out patterns are for perforation marks or dashed lines.

Example PJL job parameters may include a dash parameter, a perforation parameter, and a dash-perforation parameter (for combinations of dashed lines and perforations). The dashed lines or perforation could be chosen depending on how the interior cut-out patterns and/or white spaces are filled using odd-even fill method or other fill method algorithms.

Figure 10:
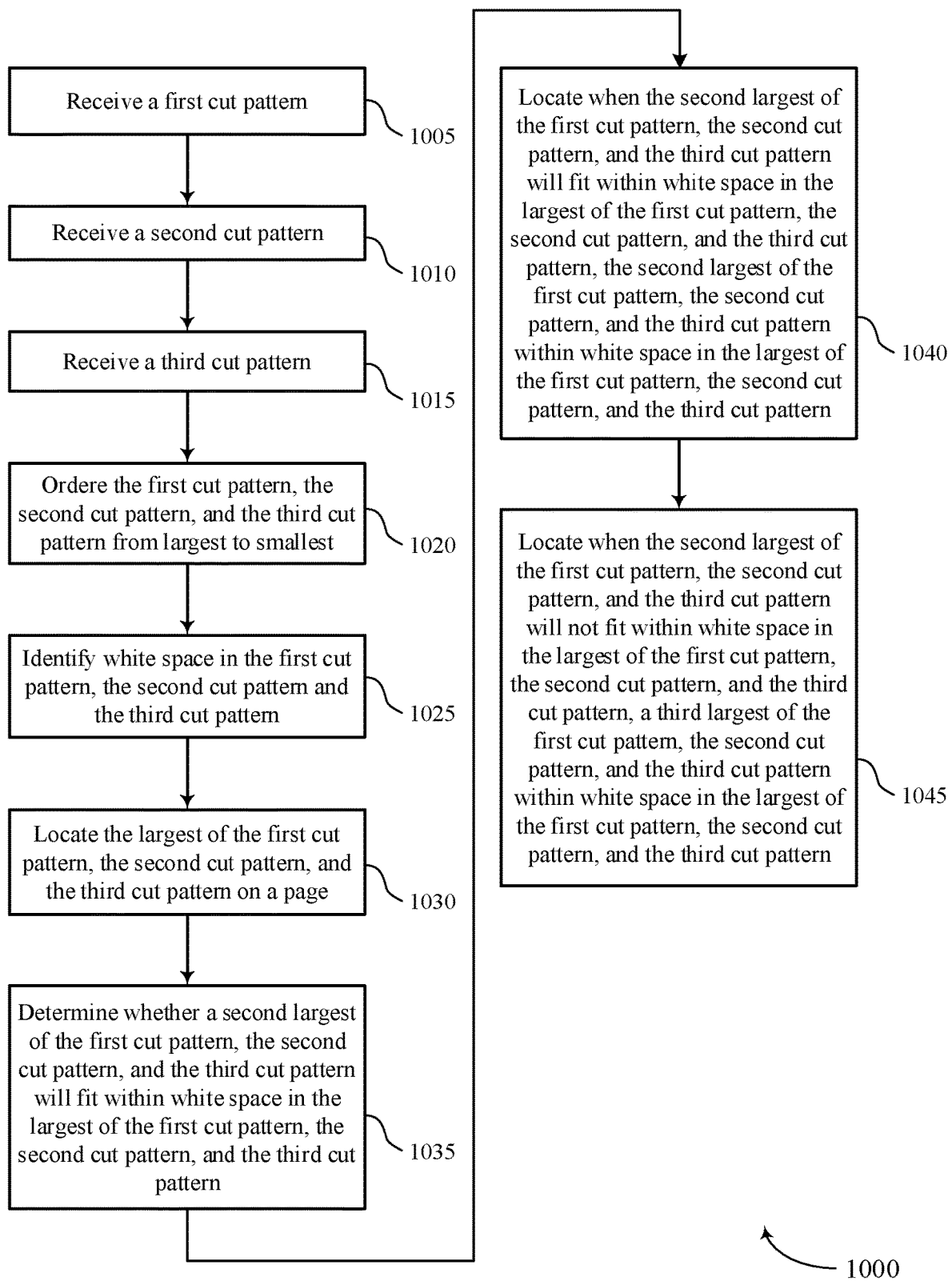
FIG. 10 shows a flowchart of a process for arranging shapes within a document prior to printing cut-out images in accordance with aspects of the present disclosure.

FIG. 10 shows a flowchart 1000 of a process for arranging shapes within a document prior to printing cut-out images in accordance with aspects of the present disclosure. In some examples, a Cut-Out Printing Service or a Cut-Out Scanning Service may execute a set of codes to control functional elements of the Cut-Out Printing Service or Cut-Out Scanning Service to perform the described functions. Additionally, or alternatively, a Cut-Out Printing Service or a Cut-Out Scanning Service may use special-purpose hardware.

At block 1005 the Cut-Out Printing Service or Cut-Out Scanning Service may receive a first cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 245 as described with reference to FIG. 2. In other examples, aspects of the described operations may be performed by Cut-Out Scanning Service 120 as described with reference to FIG. 1.

At block 1010 the Cut-Out Printing Service or Cut-Out Scanning Service may receive a second cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 245 as described with reference to FIG. 2. In other examples, aspects of the described operations may be performed by Cut-Out Scanning Service 120 as described with reference At block 1015 the Cut-Out Printing Service or Cut-Out Scanning Service may receive a third cut pattern.

These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Printing Service 245 as described with reference to FIG. 2. In other examples, aspects of the described operations may be performed by Cut-Out Scanning Service 120 as described with reference to FIG. 1.

At block 1020 the Cut-Out Printing Service or Cut-Out Scanning Service may order the first cut pattern, the second cut pattern, and the third cut pattern from largest to smallest. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1. In other examples, aspects of the described operations may be performed by Cut-Out Identification Component 295 as described with reference to FIG. 2.

At block 1025 the Cut-Out Printing Service or Cut-Out Scanning Service may identify white space in the first cut pattern, the second cut pattern and the third cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1. In other examples, aspects of the described operations may be performed by Cut-Out Identification Component 295 as described with reference to FIG. 2.

At block 1030 the Cut-Out Printing Service or Cut-Out Scanning Service may locate the largest of the first cut pattern, the second cut pattern, and the third cut pattern on a page. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1. In other examples, aspects of the described operations may be performed by Cut-Out Identification Component 295 as described with reference to FIG. 2.

At block 1035 the Cut-Out Printing Service or Cut-Out Scanning Service may determine whether a second largest of the first cut pattern, the second cut pattern, and the third cut pattern will fit within white space in the largest of the first cut pattern, the second cut pattern, and the third cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1. In other examples, aspects of the described operations may be performed by Cut-Out Arrangement Component 255 as described with reference to FIG. 2.

After block 1035, the process proceeds to block 1040 or block 1045 depending on the determination in block 1035. Specifically, whether the second largest of the first cut pattern, the second cut pattern, and the third cut pattern will fit within white space in the largest of the first cut pattern, the second cut pattern, and the third cut pattern. If the second largest of the first cut pattern, the second cut pattern, and the third cut pattern will fit within white space in the largest of the first cut pattern, block 940 is carried out. If the second largest of the first cut pattern, the second cut pattern, and the third cut pattern will not fit within white space in the largest of the first cut pattern, block 1045 is carried out. In some embodiments, based on the computer executable codes for defining the condition in blocks 1035, 1040, and 1045, blocks 1040 and 1045 may be considered to be carried out sequentially in either order or in parallel. For example, the system may be programmed to consider whether the conditions for carrying out block 1040 is met, and if not, carry out block 1045 by default or vice versa. The logics of the computer executable code may be variously implemented without departing from the spirit of the present disclosure.

At block 1040 the Cut-Out Printing Service or Cut-Out Scanning Service may locate when the second largest of the first cut pattern, the second cut pattern, and the third cut pattern will fit within white space in the largest of the first cut pattern, the second cut pattern, and the third cut pattern, the second largest of the first cut pattern, the second cut pattern, and the third cut pattern within white space in the largest of the first cut pattern, the second cut pattern, and the third cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1. In other examples, aspects of the described operations may be performed by Cut-Out Arrangement Component 255 as described with reference to FIG. 2.

At block 1045 the Cut-Out Printing Service or Cut-Out Scanning Service may locate when the second largest of the first cut pattern, the second cut pattern, and the third cut pattern will not fit within white space in the largest of the first cut pattern, the second cut pattern, and the third cut pattern, a third largest of the first cut pattern, the second cut pattern, and the third cut pattern within white space in the largest of the first cut pattern, the second cut pattern, and the third cut pattern. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1. In other examples, aspects of the described operations may be performed by Cut-Out Arrangement Component 255 as described with reference to FIG. 2.

It should be understood that the steps 1005-1045 may be performed in a different order than that presented in FIG. 10. Various steps and operations may be performed in parallel as well. The order of the operations depicted is provided for explanatory reasons and is merely one example combination of operations in accordance with some embodiments described herein.

Figure 11:
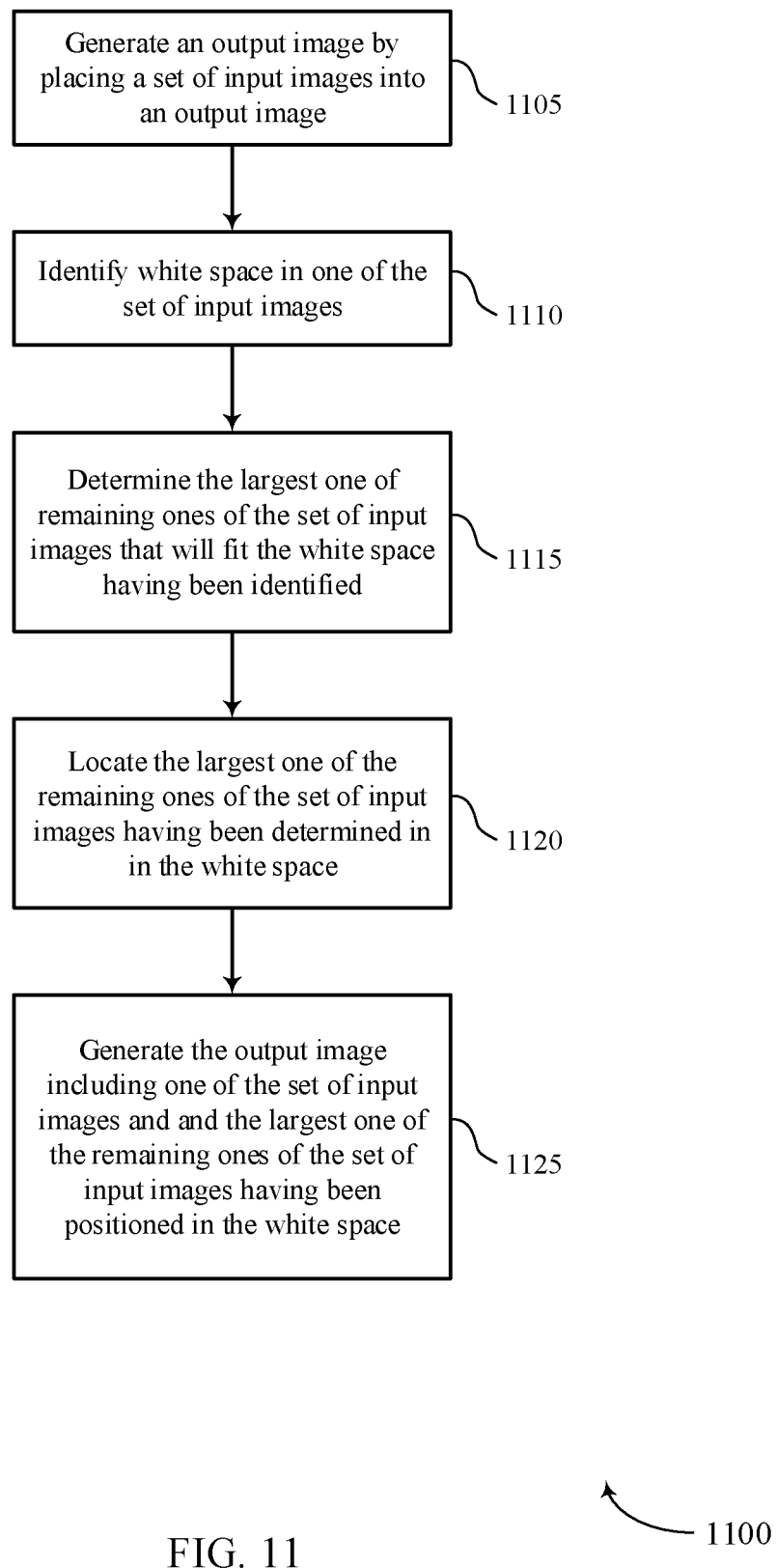
FIG. 11 shows a flowchart of a process for arranging shapes within a document prior to printing cut-out images in accordance with aspects of the present disclosure.

FIG. 11 shows a flowchart 1100 of a process for arranging shapes within a document prior to printing cut-out images in accordance with aspects of the present disclosure. In some examples, a Cut-Out Printing Service or a Cut-Out Scanning Service may execute a set of codes to control functional elements of the Cut-Out Printing Service or Cut-Out Scanning Service to perform the described functions. Additionally, or alternatively, a Cut-Out Printing Service or a Cut-Out Scanning Service may use special-purpose hardware.

At block 1105 the Cut-Out Printing Service or Cut-Out Scanning Service may generate an output image by placing a plurality of input images into an output image. These operations may be performed according to the methods and processes described in accordance with aspects of the present disclosure. For example, the operations may be composed of various substeps or may be performed in conjunction with other operations described herein. In other examples, aspects of the described operations may be performed by Cut-Out Scanning Service 120 as described with reference to FIG. 1. In certain examples, aspects of the described operations may be performed by Cut-Out Printing Service 245 as described with reference to FIG. 2.

At block 1110 the Cut-Out Printing Service or Cut-Out Scanning Service may identify white space in one of the plurality of input images. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1.

At block 1115 the Cut-Out Printing Service or Cut-Out Scanning Service may determine the largest one of remaining ones of the plurality of input images that will fit the white space having been identified. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1. In other examples, aspects of the described operations may be performed by Cut-Out Identification Component 295 as described with reference to FIG. 2.

At block 1120 the Cut-Out Printing Service or Cut-Out Scanning Service may locate the largest one of the remaining ones of the plurality of input images having been determined in the white space. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Identification Component 125 as described with reference to FIG. 1. In other examples, aspects of the described operations may be performed by Cut-Out Identification Component 295 as described with reference to FIG. 2.

At block 1125 the Cut-Out Printing Service or Cut-Out Scanning Service may generate the output image comprising one of the plurality of input images and the largest one of the remaining ones of the plurality of input images having been positioned in the white space. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Arrangement Component 135 as described with reference to FIG. 1. In other examples, aspects of the described operations may be performed by Cut-Out Arrangement Component 255 as described with reference to FIG. 2.

Figure 12:
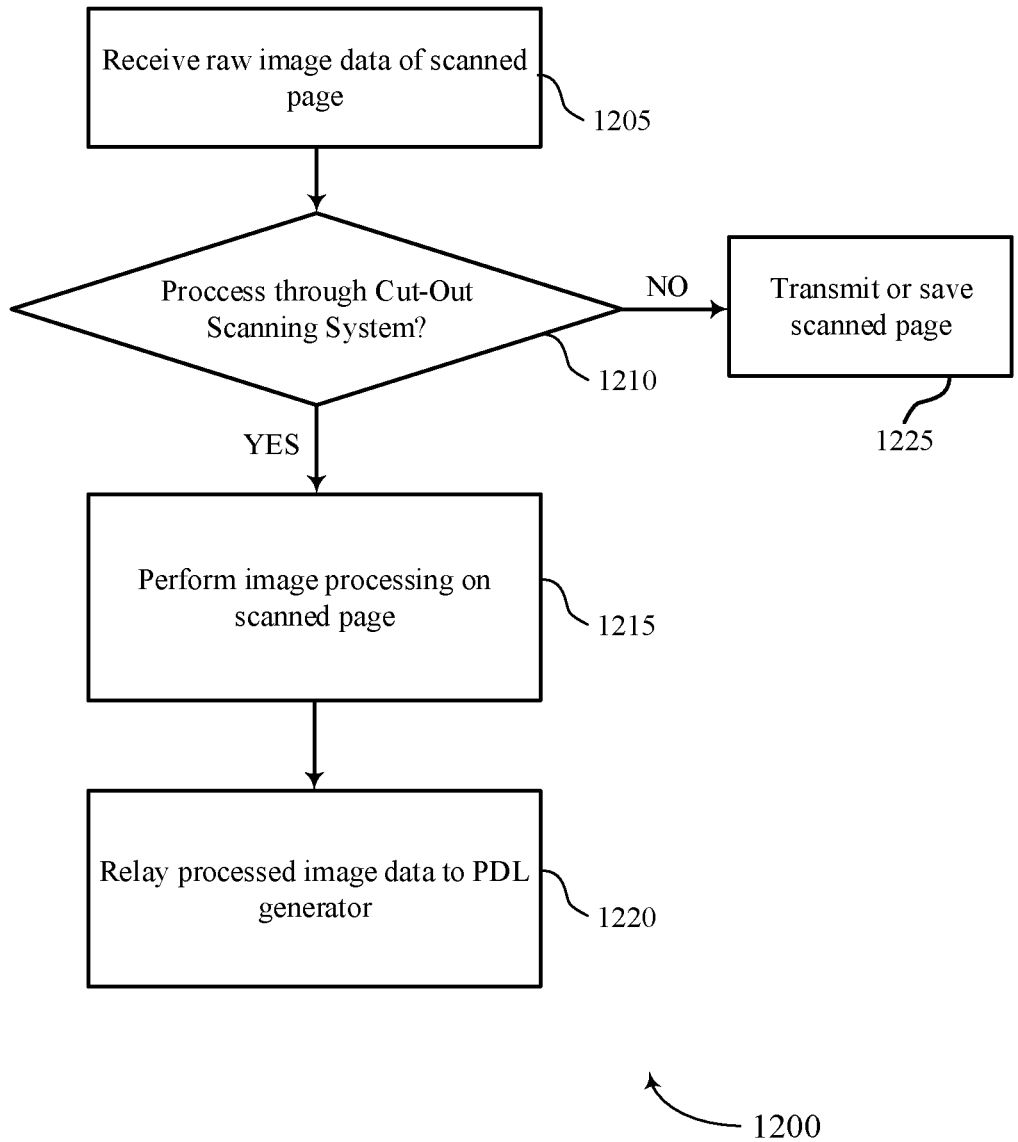
FIG. 12 shows a flowchart of a process for raw image processing in accordance with aspects of the present disclosure.

FIG. 12 shows a flowchart 1200 of a process for raw image processing in accordance with aspects of the present disclosure. In some examples, a Cut-Out Scanning System may execute a set of codes to control functional elements of the Cut-Out Scanning System to perform some of the described functions. Additionally, or alternatively, a Cut-Out Scanning System may use special-purpose hardware.

At block 1205 the Cut-Out Scanning System may receive raw image data of a scanned page. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Scanning System 112 as described with reference to FIG. 1. In other examples, aspects of the described operations may be performed by Cut-Out Scanning System 210 as described with reference to FIG. 2.

At block 1210 the Cut-Out Scanning System may determine whether to process the scanned page. If the Cut-Out Scanning System determines that the scanned page will be processed, the process may proceed to block 1215. Otherwise, if the Cut-Out Scanning System determines that the scanned page will not be processed, the process may proceed to block 1225. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Scanning System 112 as described with reference to FIG. 1. In other examples, aspects of the described operations may be performed by Cut-Out Scanning System 210 as described with reference to FIG. 2.

At block 1215 the Cut-Out Scanning System performs image processing on the scanned page. These operations may be performed according to the methods and processes described in accordance with aspects of the present disclosure. For example, the operations may be composed of various substeps or may be performed in conjunction with other operations described herein. In certain examples, aspects of the described operations may be performed by the Image Processor 115 as described with reference to FIG. 1. In other examples, aspects of the described operations may be performed by Image Processor 225 as described with reference to FIG. 2. In other examples, the aspects of the described operations may be described with reference to FIG. 13.

At block 1220 the Cut-Out Scanning System relays the processed image data to a PDL Generator. These operations may be performed according to the methods and processes described in accordance with aspects of the present disclosure. For example, the operations may be composed of various substeps or may be performed in conjunction with other operations described herein. In certain examples, aspects of the described operations may be performed by the Image Processor 115 as described with reference to FIG. 1. In other examples, aspects of the described operations may be performed by Image Processor 225 as described with reference to FIG. 2.

At block 1225 the Cut-Out Scanning System may transmits or save the scanned page without any image processing. These operations may be performed according to the methods and processes described in accordance with aspects of the present disclosure. For example, the operations may be composed of various substeps or may be performed in conjunction with other operations described herein. In certain examples, aspects of the described operations may be performed by Cut-Out Scanning System 112 as described with reference to FIG. 1. In other examples, aspects of the described operations may be performed by Cut-Out Scanning System 210 as described with reference to FIG. 2.

Figure 13:
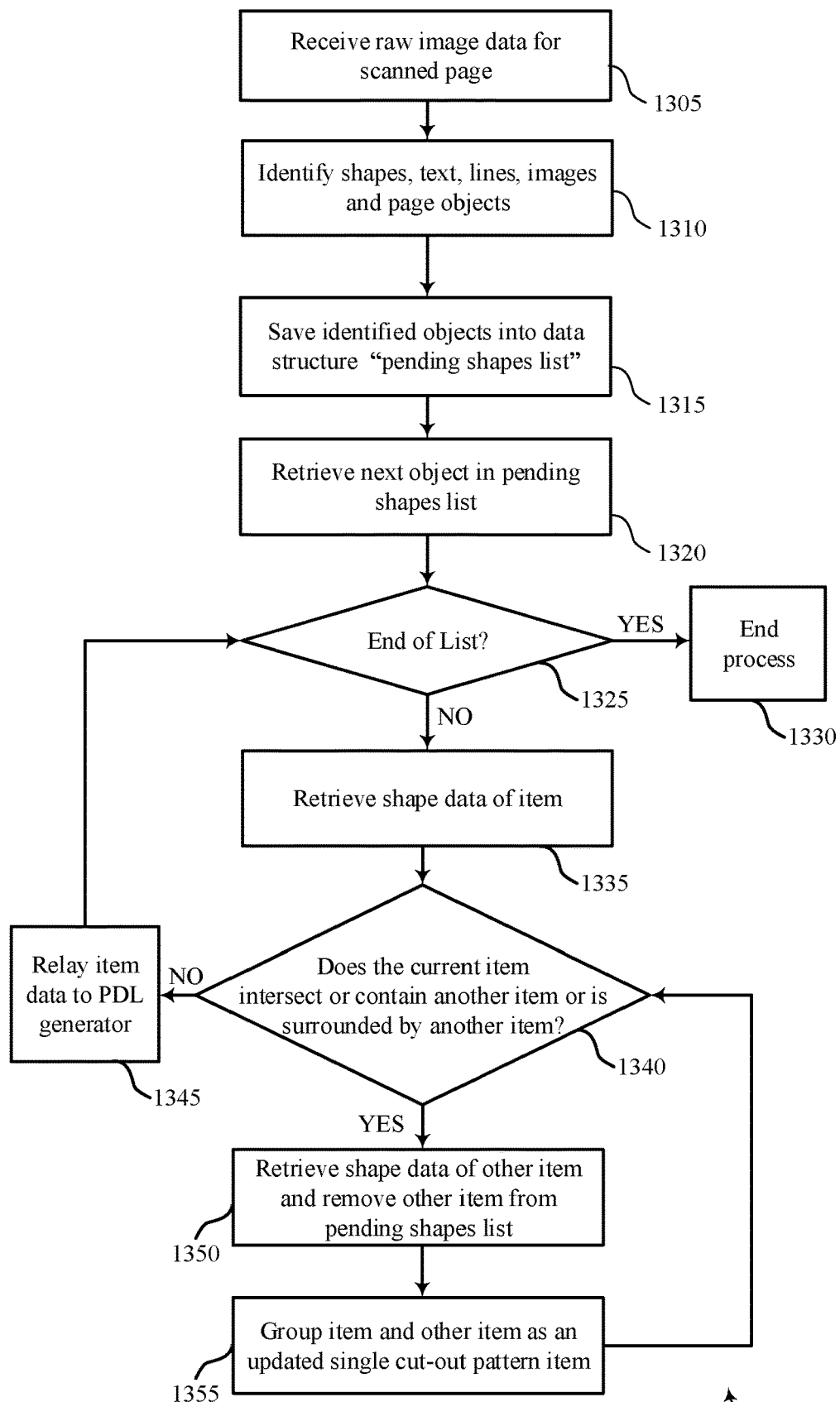
FIG. 13 shows a flowchart of a process for cut-out pattern identification in accordance with aspects of the present disclosure.

FIG. 13 shows a flowchart 1300 of a process for cut-out pattern identification in accordance with aspects of the present disclosure. In some examples, an Image Processor may execute a set of codes to control functional elements of the Image Processor to perform some of the described functions. Additionally, or alternatively, an Image Processor may use special-purpose hardware.

At block 1305 the Image Processor may receive raw image data of a scanned page. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

At block 1310 the Image Processor may identify shapes, text, lines, images and page objects. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

At block 1315 the Image Processor may save identified objects into a data structure. In some embodiments the data structure is designated as "pending shapes list". These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

At block 1320 the Image Processor may retrieve the next identified object in the pending shapes list. In some embodiments the data structure is designated as "pending shapes list". Initially, the next item is the first object in the list. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

At block 1325 the Image Processor may determine whether an end of the list has been reached, i.e. there are no more objects on the list. If the Image processor determines that the end of the list has been reached, the process proceeds to End Process block 1330 and the process ends. If the Image Processor determines that the end of the list has not been reached, the process proceeds to block 1335. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

At block 1335 the Image Processor may retrieve the shape data of the item from the pending shapes list data structure. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

At block 1340 the Image Processor may determine whether the item intersects another item, contains another item, and/or is surrounded by another item. If the Image processor determines that the item does not intersect another item, contain another item, or is surrounded by another item, the process proceeds to block 1345. If the Image Processor determines that the item intersects another item, contains another item, or is surrounded by another item, the process proceeds to block 1350. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

At block 1345 the Image Processor may relay data for the item to a PDL Generator. The process then returns to block 1325 and repeats for the next item on the list (or ends if there are no more items). These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

At block 1350 the Image Processor may retrieve shape data for the other item that intersects, surrounds, or contains the current item. The Image processor also removes the other item data from the pending shapes list. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

At block 1355 the Image Processor groups the current item and the other item and updates the current item to include the other item in a single cut-out pattern. The method then returns to block 1340, where the Image Processor checks to see if there is another item that intersects/contains/is surrounded by the updated current item. These operations may be performed according to the methods and processes described in accordance with aspects of the present disclosure. For example, the operations may be composed of various substeps or may be performed in conjunction with other operations described herein. In certain examples, aspects of the described operations may be performed by Image Processor 125 as described with reference to FIG. 1. In other examples, aspects of the described operations may be performed by Image Processor 225 as described with reference to FIG. 2.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples, and applications thereof, numerous modifications and variations could be made thereto by those skilled in the art without departing from the scope of the invention set forth in the claims.

What is claimed is:

1. A printing system comprising:
    a printing device; and
    a scanning service in communication with the printing device and adapted to:
        receive a plurality of page description language (PDL)-formatted cut-out patterns;
        receive a reference to a logical page;
        detect white space in the plurality of PDL-formatted cut-out patterns by detecting areas with no color;
        optimally position the PDL-formatted cut-out patterns on the logical page, wherein the optimal positioning includes locating a PDL-formatted cut-out pattern, that fits within interior white space of another a PDL-formatted cut-out pattern, within the interior white space of the other a PDL-formatted cut-out pattern; and
        generate a PDL drawing command for each PDL-formatted cut-out pattern identifying an outline of the PDL-formatted cut-out pattern identifying where at least one of cutting and perforation will occur on the logical page.

2. The printing system of claim 1, further comprising:
    a PDL generator configured to receive image-formatted cut-out pattern data, convert the cut-out pattern data to PDL-formatted cut-out patterns, and send the PDL-formatted cut-out patterns to the scanning service.

3. The printing system of claim 2, further comprising:
    an image processor configured to receive raw image data, identify cut-out patterns in the raw image data, create image-formatted cut-out pattern data from the raw image data, and send the image-formatted cut-out data to the PDL generator.

4. The printing system of claim 3, further comprising:
    a scanner configured to capture raw image data and send the raw image data to the image processor.

5. The printing system of claim 3, the image processor further comprising:
    a user-interactive preview and marking application configured to allow a user to view the raw image data and the identified cut-out patterns, and edit the identified cut-out patterns.

6. The printing system of claim 5, the preview and marking application further configured to allow the user to group together a plurality of identified cut-out patterns to form a more complex cut-out pattern.

7. The printing system of claim 1, the scanning service further configured to generate a PDL print job including the PDL-formatted cut-out patterns optimally positioned on the logical page, and the PDL drawing commands.

8. The printing system of claim 7, further comprising:
    a raster image processing (RIP) service configured to receive the PDL print job from the scanning service.

9. A method for printing by a printing system, comprising the steps of:
    receiving a plurality of page description language (PDL)-formatted cut-out patterns;
    detecting white space in the plurality of PDL-formatted cut-out patterns by detecting areas with no color;
    optimally positioning the plurality of PDL-formatted cut-out patterns on a logical page, wherein the optimal positioning includes locating a PDL-formatted cut-out pattern, that fits within interior white space of another PDL-formatted cut-out pattern, within the white space of that PDL-formatted cut-out pattern; and
    generating a PDL drawing command for each PDL-formatted cut-out pattern identifying an outline of the PDL-formatted cut-out pattern identifying where at least one of cutting and perforation will occur on the logical page.

10. The method for printing by the printing system of claim 9, wherein receiving the plurality of PDL-formatted cut-out patterns further comprises:
    receiving image-formatted cut-out pattern data; and
    converting the image-formatted cut-out pattern data to PDL-formatted cut-out patterns.

11. The method for printing by the printing system of claim 10, wherein receiving the plurality of PDL-formatted cut-out patterns further comprises:
    receiving raw image data;
    identifying cut-out patterns in the raw image data; and
    creating the image-formatted cut-out pattern data from the raw image data.

12. The method for printing by the printing system of claim 11, wherein receiving the plurality of PDL-formatted cut-out patterns further comprises:
    capturing the raw image data.

13. The method for printing by the printing system of claim 11, wherein identifying cut-out patterns in the raw image data further comprises:
    identifying, by the printing system, of an initial set of identified cut-out patterns;
    displaying the raw image data and the initial set of identified cut-out patterns; and
    editing, by a user using an interactive application of the printing system, of the initial set of identified cut-out patterns.

14. The method for printing by the printing system of claim 9, further comprising:
    creating a PDL print job including the PDL-formatted cut-out patterns optimally positioned on the logical page, and the PDL drawing commands.

15. The method for printing by the printing system of claim 14, further comprising:

receiving of the PDL print job by a raster image processing (RIP) service of the printing system.

16. A method for printing by a printing system, comprising the steps of:
receiving of raw image data;
identifying cut-out patterns in the raw image data;
creating image-formatted cut-out pattern data from the raw image data;
converting the image-formatted cut-out pattern data to a plurality of PDL-formatted cut-out patterns;
receiving a reference to a logical page;
detecting white space in the plurality of PDL-formatted cut-out patterns by detecting areas with no color;
optimally positioning the PDL-formatted cut-out patterns on the logical page, wherein the optimal positioning includes locating a PDL-formatted cut-out pattern, that fits within interior white space of another a PDL-formatted cut-out pattern, within the interior white space of the other a PDL-formatted cut-out pattern; and
generating a PDL drawing command for each PDL-formatted cut-out pattern identifying an outline of the PDL-formatted cut-out pattern identifying where at least one of cutting and perforation will occur on the logical page.

17. The method for printing by the printing system of claim 16, further comprising the step of, prior to receiving the raw image data, capturing the raw image data.

18. The method for printing by the printing system of claim 16, further comprising the step of generating a PDL print job including the PDL-formatted cut-out patterns optimally positioned on the logical page, and the PDL drawing commands.

19. The method for printing by the printing system of claim 18, further comprising the step of generating graphics orders based on the PDL print job.

20. The method for printing by the printing system of claim 19, wherein the graphics orders include orders for rendering of the cut-out patterns and for at least one of cutting and perforating, and further comprising the steps of:
sending the graphics orders to a printing device;
printing by the printing device of the graphics orders onto physical media;
relaying of the graphics orders for at least one of cutting and perforating to at least one of a cutter finisher and a perforation marking tool; and
performing at least one of cutting and perforating on the physical media.

* * * * *